United States Patent [19]

Youngs et al.

[11] Patent Number: 5,875,614
[45] Date of Patent: Mar. 2, 1999

[54] APPARATUS AND METHODS FOR FORMING FLEXIBLE PACKAGING CONTAINERS FOR DISCS

[75] Inventors: Ross O. Youngs, Dublin; James L. Weatherford, Sr., Hilliard; David S. Yotive, Marysville; Roger J. Gerdeman; George E. Spohn, both of Columbus; Martin W. Smith, Hilliard; Todd Espenschied, Grove City; Todd M. Stern, Powell, all of Ohio

[73] Assignee: Univenture Inc., Columbus, Ohio

[21] Appl. No.: 936,875

[22] Filed: Sep. 25, 1997

[51] Int. Cl.$^6$ .................................................. B65B 43/04
[52] U.S. Cl. .............................. 53/455; 53/562; 53/254; 53/DIG. 2
[58] Field of Search ............................. 53/455, 476, 477, 53/553, 562, 254, 375.9, 373.7, 459, DIG. 2

[56] References Cited

U.S. PATENT DOCUMENTS

| | | | |
|---|---|---|---|
| 2,350,930 | 6/1944 | Salfisberg | 93/3 |
| 3,500,995 | 3/1970 | Forman | 206/84 |
| 3,503,175 | 3/1970 | Marasso et al. | 53/28 |
| 3,579,948 | 5/1971 | Lerner | 53/29 |
| 3,599,388 | 8/1971 | Feingold | 53/29 |
| 3,603,522 | 9/1971 | Hermann | 242/56 R |
| 3,651,615 | 3/1972 | Bohner et al. | 53/28 |
| 3,727,769 | 4/1973 | Scholl | 210/484 |
| 3,735,551 | 5/1973 | Pratt | 53/22 A |
| 4,149,356 | 4/1979 | Palmer | 53/459 |
| 4,377,061 | 3/1983 | Olson et al. | 53/433 |
| 4,393,640 | 7/1983 | Cole et al. | 53/69 |
| 4,610,352 | 9/1986 | Howey et al. | 206/313 |
| 4,850,731 | 7/1989 | Youngs | 402/79 |
| 5,155,973 | 10/1992 | Hipko et al. | 53/452 |
| 5,161,350 | 11/1992 | Nakamura | 53/412 |
| 5,181,365 | 1/1993 | Garvey et al. | 53/455 |
| 5,215,609 | 6/1993 | Sanders | 156/70 |
| 5,371,999 | 12/1994 | Hansen et al. | 53/450 |
| 5,400,569 | 3/1995 | Jones et al. | 53/433 |
| 5,407,067 | 4/1995 | Cotter et al. | 206/312 |
| 5,462,160 | 10/1995 | Youngs | 206/312 |
| 5,485,714 | 3/1996 | Montalvo | 53/459 |
| 5,524,420 | 6/1996 | Ikuta | 53/450 |
| 5,533,322 | 7/1996 | Bacon et al. | 53/451 |
| 5,546,732 | 8/1996 | Coleman et al. | 53/450 |
| 5,588,528 | 12/1996 | Ozeki | 206/308.1 |
| 5,595,797 | 1/1997 | Miller | 428/35.2 |
| 5,595,798 | 1/1997 | Miller | 428/35.2 |

*Primary Examiner*—James F. Coan
*Assistant Examiner*—Gene L. Kim
*Attorney, Agent, or Firm*—Wood, Herron & Evans, LLP

[57] ABSTRACT

An apparatus (100) for making flexible packaging containers (20, 70, 84) and inserting and sealing discs (22) within the containers in one continuous operation includes a nip roll indexer (116) which intermittently advances free ends of a first web (108) and a second web (110) a distance defining at least a width of a container, a die cut press (112) for forming partially separable flaps in the first web, first and second ultrasonic welders (220, 226) which concurrently seal together the first and second webs along a first longitudinal seal line (258) and at least one transverse seal line (252) so as to create in the webs a series of disc-receiving areas (40) each defined by the first longitudinal seal lines together with two of the transverse seal lines and having an open edge adjacent second longitudinal edges (256) of the webs, a disc inserting apparatus (120) adapted to insert a disc into a disc-receiving area, a third ultrasonic welder (380) which seals the webs together along a second longitudinal seal line (390) adjacent and parallel to the second longitudinal edges of the webs, and a separating station (126) which cuts the webs along a cut line adjacent and parallel to one of the transverse seal lines to create discrete containers each having a disc sealed inside.

44 Claims, 14 Drawing Sheets

APPARATUS AND METHODS FOR FORMING FLEXIBLE PACKAGING CONTAINERS FOR DISCS

FIELD OF THE INVENTION

The present invention relates to machines for packaging compact discs and, more particularly, to a machine for forming flexible packaging sleeves and inserting compact discs into partially completed sleeves and sealing the sleeves closed with discs inside.

BACKGROUND OF THE INVENTION

Compact discs have become a popular recording medium for digital information including audio program material as well as other data such as computer software and the like. A compact disc (CD) includes a reflective optical surface which is encoded with the digitally encoded data. The optical surface is read with the aid of a laser, which impinges a beam onto the optical surface. Reflections of the beam are captured and converted into digital signals representing the digital information on the disc. Thus, it will be appreciated that faithful reproduction of the information on the disc may be impaired by scratches, dust, or other imperfections introduced into the optical surface during shipping, storage, or handling of a CD.

Because of the need to protect the optical surface of a CD, various CD storage devices, both rigid and flexible, have been developed. An example of a rigid storage container is the jewel box, which consists of two pieces of molded polycarbonate hingedly connected along one side. A styrene tray with a center hub is snap fit inside one of the polycarbonate pieces, the center hub being formed to engage the center aperture of a CD and hold the CD with the optical surface not in contact with any portion of the box. Jewel boxes have an advantage of being suitable for holding a CD not only during shipment from a manufacturer, but also for after-market storage by the consumer. However, although the jewel box serves to protect the CD, it suffers from several disadvantages. The box is difficult to open, and it is difficult to remove the CD from the center hub without bending the CD. The box is also relatively fragile, resulting in breakage of the hinges or the polycarbonate pieces when accidentally dropped. Furthermore, the jewel box is expensive to manufacture because of the three-piece construction and the need to manually assemble the parts. Finally, the jewel box is relatively bulky, generally having a thickness many times the thickness of the CD itself.

As an alternative to the jewel box, various types of flexible CD storage containers have been developed. One example of a flexible CD container is shown in my U.S. Pat. No. 5,462,160, which is incorporated herein by reference. The container is comprised of a first flexible sheet to which is joined a nonwoven fabric sheet, with an overlying second flexible sheet joined along its edges by heat lamination to the first flexible sheet through the nonwoven fabric to create a CD storage area. Access to the storage area is provided by a flap cut into the second flexible sheet within the boundary of the bond to permit insertion of a CD into the storage area so that the optical surface contacts the nonwoven fabric. Although the container described in the '160 patent provides excellent storage protection for the CD, it has at least two notable drawbacks. First, the container is primarily useful as an after-market storage container. It is not well suited for use as a shipping container, because a manufacturer would have to resort to a relatively expensive procedure of manually inserting a CD into the container. Second, the heat lamination process for bonding the edges of the sheets together tends to introduce distortion into the sheets, resulting in a somewhat wavy appearance.

Yet another flexible CD container is marketed by the assignee of the present application under the trademark "ADHESIVEPAK". The container is comprised of three sheets joined along three common edges, the top edges of the sheets being left unbonded. This container has a first pocket defined by a first sheet and an intermediate sheet and a second pocket defined by the intermediate sheet and a second sheet. A CD is stored in the first pocket with the optical surface in contact with the intermediate sheet. Graphics material may be stored in the second pocket. The first sheet is transparent to permit viewing of graphics printed on the non-optical surface of the CD, and has a perforated cut line wider than a CD diameter to define a flap which may be partially separated from the remainder of the first sheet to create an opening for insertion and removal of a CD. At one side of the bottom of the cut line, the line is fully cut to form a tab portion of the flap which may be grasped and pulled to initiate breaking of the perforations. The intermediate sheet is a composite of a flexible layer bonded to a nonwoven fabric layer, with the nonwoven fabric facing the first sheet. The second sheet is a composite of an adhesive-backed vinyl layer and a paper layer having a glossy surface in contact with the adhesive side of the vinyl layer. The paper layer may be peeled off to expose the adhesive side of the vinyl layer, so that the container may be pasted onto a page in an album, book, or the like. Openings to the first and second pockets are defined by slits in the intermediate and second sheets, respectively, which slits are spaced inward of a top edge of the container. A strip of adhesive runs adjacent to the top edge, so that when the container is pasted down onto a page, the openings to the pockets are effectively closed. The ADHESIVEPAK container is primarily intended as an after-market storage device, and the operation of pasting the container onto a page is intended to be carried out by the end user or purchaser of the container. After the container has been pasted down onto a page, a CD is then inserted into or removed from the first pocket by breaking the perforations of the flap cut line to create an opening in the first sheet. However, since a CD may be inserted into the container without disturbing the perforations of the flap cut line, the ADHESIVEPAK container could also be used as a shipping container. Nevertheless, the container has the disadvantage that the CD storage area remains open at its top opening until the container is pasted onto a page, which may allow the CD accidentally to slip out of the container during shipping. The unsealed opening may also permit infiltration of foreign material into the container during shipping or after-market storage and handling of the container, which may lead to scratching of the CD optical surface.

Thus, prior flexible containers for compact discs have not been amenable to being formed, filled with a CD, and sealed closed on all edges in one continuous automated operation.

SUMMARY OF THE INVENTION

The present invention overcomes the drawbacks noted above by providing an apparatus and methods for manufacturing a flexible packaging container, inserting a CD into the container, and sealing the container closed in one continuous automated operation, such that a CD is completely sealed inside the container during manufacture of the container, thereby preventing accidental loss of the CD and infiltration of foreign material into the container both during shipping of the CD and container and during after-market storage of the CD in the container. The container is comprised of first and second flexible sheets joined together along all peripheral edges of the sheets to define a disc-receiving area which is completely sealed. The second sheet has a nonwoven surface, and the first sheet overlies the nonwoven surface. A CD resides within the disc-receiving area of the container with its optical surface in contact with the nonwoven surface of the second sheet. Alternatively, if the CD has information stored on both sides, then the first sheet may also include a nonwoven surface facing the nonwoven surface of the second sheet so that both optical surfaces are protected from scratching. During manufacturing of the container, advantageously the sheets are initially joined together along most of their common peripheral edges but are left unjoined along a portion of their edges to allow access to the disc-receiving area. A CD is then automatically inserted into the container through the opening defined by the unjoined portion of the edges, and the unjoined portion of the edges of the sheets are then joined together to seal the CD inside the container. Advantageously, the sheets are joined by ultrasonic welding or an equivalent welding method, which results in significantly less distortion of the sheets than heat bonding.

The first sheet has a line of weakness which is breakable to create a disc-removing opening in the first sheet. Preferably, the line of weakness defines a flap which is partially separable from the remainder of the first sheet to create an opening in the first sheet and thereby allow access to the disc-receiving area. When the flap is positioned over the CD, there is a substantially continuous single-thickness surface overlying the CD to provide protection to the non-optical surface of the CD. The first sheet is advantageously transparent to permit viewing of the non-optical surface, which typically is printed with identifying graphics. The line of weakness terminates at two ends adjacent an edge of the first sheet. In one embodiment of the container, the ends include arcuate regions defining a hinge therebetween, such that when the line of weakness is broken and the flap is partially separated from the remainder of the first sheet, the opening force becomes directed along the line of the hinge, thereby preventing tearing of the first sheet beyond the ends of the line of weakness. In another embodiment of the container, the ends of the line of weakness are substantially straight and terminate in close proximity to a seal line along which the first and second sheets are joined together, so that the seal line prevents unwanted tearing of the flap. Advantageously, the line of weakness includes a portion which is completely cut to define a tab portion of the flap to assist in initially opening the flap.

The container may further advantageously include a graphics storage area along one edge of the container designed to receive identifying graphics, such as those presently displayed on the spine of a jewel box. Advantageously, the graphics storage area is located along the edge of the container perpendicular to the hinge line of the flap. The container may also include an "end region" adjacent an edge of the container which can be hole-punched or otherwise utilized to permit the container to be retained in a storage system. Advantageously, the end region is located adjacent the graphics storage area along the edge of the container perpendicular to the hinge line of the flap. The container may also include a third sheet overlying the second sheet on the side opposite the nonwoven surface to define a second storage area for additional graphics material. An opening to the second graphics storage area may be provided either by leaving one edge of the third sheet unjoined to the second sheet, or by slitting the third sheet.

An apparatus for manufacturing the container with a disc sealed inside includes a web conveyor adapted to intermittently advance free ends of at least a first web and a second web a distance defining at least a width dimension of a container (typically at least slightly greater than the diameter of a disc to be stored); a first sealing station adapted to intermittently engage the webs to join the first and second webs together along a first longitudinal seal line adjacent and generally parallel to first longitudinal edges of the webs and along one or more transverse seal lines generally perpendicular to the direction of web travel, successive operations of the first sealing station thereby creating a series of disc-receiving areas each defined by the first longitudinal seal line together with one transverse seal line and a succeeding transverse seal line, with each disc-receiving area having an open edge adjacent second longitudinal edges of the webs; a die-cutting station adapted to intermittently engage the first web to form lines of weakness in the first web defining flaps in the first web each within the region of the first web overlying a disc-receiving area; a disc inserting apparatus adapted to transport a disc from a disc supply and insert the disc between the first and second webs within a disc-receiving area; a second sealing station adapted to intermittently engage the webs after insertion of a disc to join the webs together along a second longitudinal seal line adjacent and generally parallel to the second longitudinal edges of the first and second webs so as to close the open edge of each disc-receiving area; and a separating station adapted to cut the webs along one or more cut lines adjacent and generally parallel to one or more of the transverse seal lines to create discrete containers each having a disc sealed inside.

Advantageously, the container is rectangular and the first sealing station creates a first longitudinal seal line which is straight and parallel to the first longitudinal edges of the webs (i.e., in the direction of web travel) and one or more transverse seal lines which are straight and perpendicular to the longitudinal edges of the webs (i.e., perpendicular to the direction of web travel), and after insertion of a disc the second sealing station creates a second longitudinal seal line which is straight and parallel to the second longitudinal edges of the webs. The separating station then cuts the webs along a straight line adjacent and parallel to one of the transverse seal lines so that there is no wasted web material between adjacent containers. Alternatively, however, containers with rounded edges or containers that are generally circular or oval in shape may be created by sealing along curved longitudinal and/or transverse seal lines and by cutting the webs along curved lines parallel to the seal lines. In that case, however, some material between adjacent containers would be wasted.

Advantageously, the container includes an end region along one edge of the container which may be hole-punched or otherwise utilized, as previously noted, to allow the container to be retained in a storage system. Accordingly, the apparatus for manufacturing such containers includes a first sealing station which forms the first longitudinal seal line as noted above, and further forms spaced first and second transverse seal lines, the region between the first and second transverse seal lines ultimately becoming the end region to be hole-punched or otherwise utilized to facilitate storage of the containers in a storage system. The separating station in this embodiment separates a prior closed container from a succeeding container along a cut line between the first and second transverse seal lines, preferably immediately adjacent either the first or second transverse seal line so as to avoid the end region.

The web conveyor advantageously includes a nip roll indexer having a drive roller which is driven by a stepper motor, and further advantageously includes a vacuum conveyor belt downstream of the nip roll indexer. The vacuum conveyor belt is an endless air-permeable belt mounted about a pair of spaced-apart rollers, one roller being a drive roller which is driven in synchronization with the nip roll indexer but which drives the vacuum belt at a slightly higher linear speed than the linear speed of the webs exiting the nip roll indexer. By virtue of its higher speed, the vacuum belt takes slack out of the advancing webs to assure that the webs lie flat against the work surfaces of the disc inserter and the second sealing station, in order to assure reliable disc insertion and to substantially prevent distortion of the webs during the sealing operation.

The die-cutting, station advantageously comprises a die cut press having a reciprocating member on which is supported a cutting die configured to form a line of weakness in the first web to define a flap, and a stationary member having a working surface which cooperates with the cutting die. Advantageously, only the first web passes between the reciprocating member and the stationary member, the second web passing through a passage within the stationary member and the two webs coming together downstream of the die-cutting operation on the first web so that the second web is isolated from the cutting die.

The first sealing station advantageously includes two ultrasonic welding heads and cooperating anvils. A first ultrasonic welding head is configured to seal the webs together along one or more transverse seal lines as previously noted. The first welding head may further be configured to form a third transverse seal line between the first and second transverse seal lines so as to define a graphics storage area between the second and third transverse seal lines. The second welding head advantageously is configured to seal the webs together along a longitudinal line adjacent and parallel to first longitudinal edges of the webs. The length of the weld produced by the second welding head is approximately the width of a container, but the weld is staggered with respect to the transverse seal lines so that each end of the longitudinal weld is approximately midway between the two transverse seal lines which define the disc-receiving area of a container. Thus, successive welds of the second welding head result in a substantially continuous sealed edge of any given container along the first longitudinal edges of the webs.

The disc-inserting apparatus advantageously includes a disc supply comprising a rotatable turntable having a plurality of spindles for holding a plurality of stacks of discs, a disc transfer apparatus, and a disc inserter. The disc transfer apparatus has an arm adapted to grasp a disc, remove it from a spindle, and rotatably transport the disc and place it onto a disc rest of the disc inserter. The disc inserter includes a mechanism connected to the disc rest which provides an initial translational motion to the disc rest so as to insert the disc partially between the webs, and then a combined translational and rotational motion so as to push the disc fully between the webs and rotate the disc rest in order to clear the web conveyor structure.

Advantageously, the container apparatus further includes an unwinding apparatus for mounting continuous length supplies, such as rolls, of the webs. The unwinding apparatus advantageously includes a nip roll driver for each web and a tensioning system which maintains the tension in each web at the entrance to the die-cutting station substantially independent of the inertia of the supply rolls. The tensioning system includes a free-wheeling roller downstream of each nip roll driver at approximately the same vertical level as the nip roll driver, and a dumbbell-shaped weight having a cylindrical portion which rests on the upper surface of the web between the nip roll driver and the free-wheeling roller, with the weight at a lower vertical level than the nip roll driver. A pair of vertically spaced optical sensors are coupled to the drive system for each nip roll driver. The drive system drives each web at a rate which maintains the weight for each web between the corresponding pair of optical sensors, thereby assuring substantially even tension of each web regardless of the inertia of the continuous length supplies. The unwinding apparatus further advantageously includes a web-welding station for welding the trailing end of a roll of web material to the leading end of a new roll, so as to permit continuous uninterrupted operation of the container-forming apparatus.

It is thus an object of this invention is to provide a method and apparatus for creating a packaging container for a CD, inserting a CD into the container, and scaling the container closed with the CD inside, in one continuous automated operation.

The above and other objects and advantages of the present invention shall be made more apparent from the accompanying drawings and the description thereof.

BRIEF DESCRIPTION OF THE DRAWINGS

The accompanying drawings, which are incorporated in and constitute a part of this specification, illustrate various embodiments of the invention and, together with a general description of the invention given above, and the detailed description of the embodiments given below, serve to explain the principles of the invention.

DETAILED DESCRIPTION OF THE DRAWINGS

I. Disc Packaging Container

Figure 1:
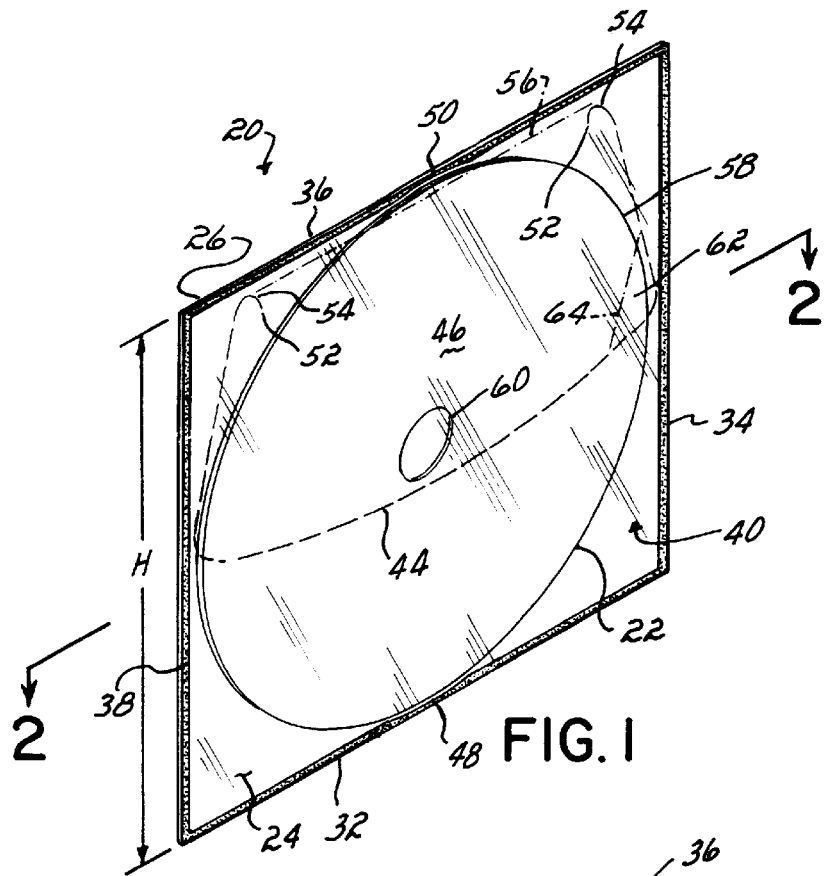
FIG. 1 is a front perspective view of a first embodiment of the container with a CD sealed inside.

With reference to the drawings, FIG. 1 depicts a first embodiment of a container 20 having a compact disc 22 sealed inside. The multilayer construction of the container 20 is shown in the cross-sectional view of FIG. 2. The container 20 is comprised of a first flexible sheet 24 and a second flexible sheet 26. The second flexible sheet 26 has a nonwoven surface 28 facing the first flexible sheet 24. The compact disc 22 is stored in the container 20 with the optical surface 30 of the compact disc in contact with the nonwoven surface 28. The nonwoven surface 28 is made of a material which does not scratch the optical surface 30.

The first flexible sheet 24 is positioned over the nonwoven surface 28 of the second flexible sheet 26 and is joined to the second flexible sheet 26 along substantially the entire length of all four peripheral edges 32, 34, 36, and 38 to define a disc receiving area 40 wherein the compact disc 22 resides. The first flexible sheet 24 advantageously is clear or transparent to permit viewing of the non-optical surface 42 of the compact disc 22, which often includes identifying graphics printed thereon.

Figure 1A:
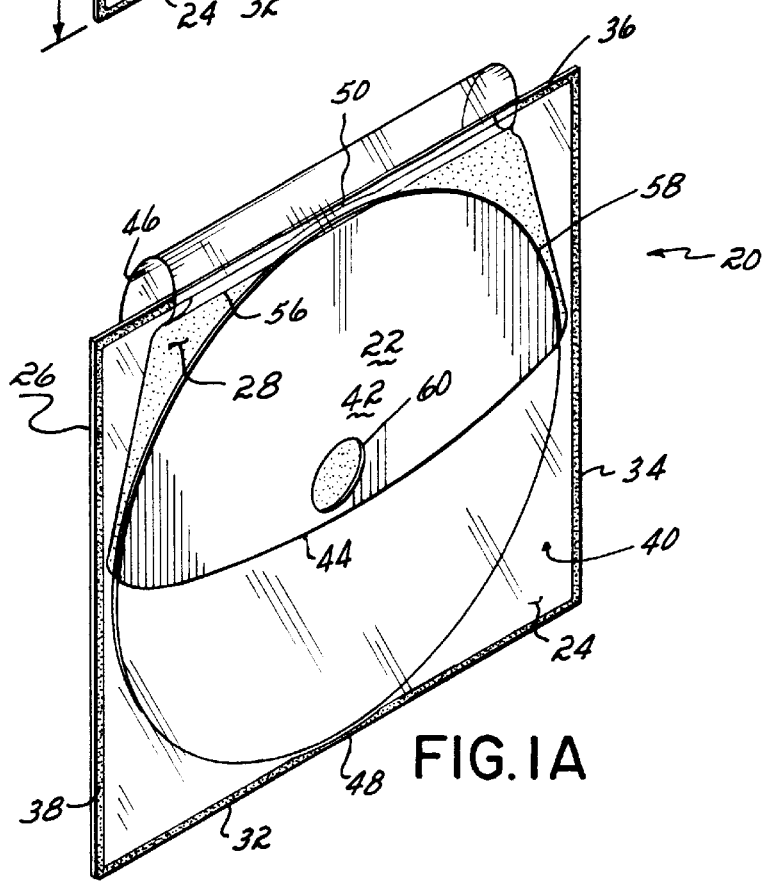
FIG. 1A is a view similar to FIG. 1 showing the container after the perforations of the flap have been broken and the flap has been raised for accessing the disc.

The first flexible sheet 24 includes a line of weakness 44 formed therein to define a flap 46 which is partially separable from the remainder of the sheet. When the flap 46 is partially separated from the remainder of the sheet 24 and lifted, as shown in FIG. 1A, an opening is created in the first flexible sheet 24 for removal of, and subsequent re-insertion of, the compact disc 22. The line of weakness 44 may be produced after the positioning of the first flexible sheet 24 over the second flexible sheet 26 and the joining of the first and second flexible sheets along their edges 32, 34, 36, and 38, by an operation known as a kiss cut, which utilizes a cutting die to form the line of weakness 44 without affecting the second flexible sheet 26. Presently, however, it is preferred to form the line of weakness 44 in the first flexible sheet 24 by die cutting prior to positioning the first flexible sheet 24 over the second flexible sheet 26 for the joining operation. In order to minimize the "height" dimension H of the container, peripheral edges 32 and 36 advantageously include regions 48 and 50 which are indented away from the compact disc 22 in the vicinity of the diameter of the compact disc 22 which is parallel to the peripheral edges 34 and 38. Where the height 11 of the container 20 is increased, the peripheral edges 32 and 36 can be formed without indent regions 48 and 50, respectively.

Figure 3:
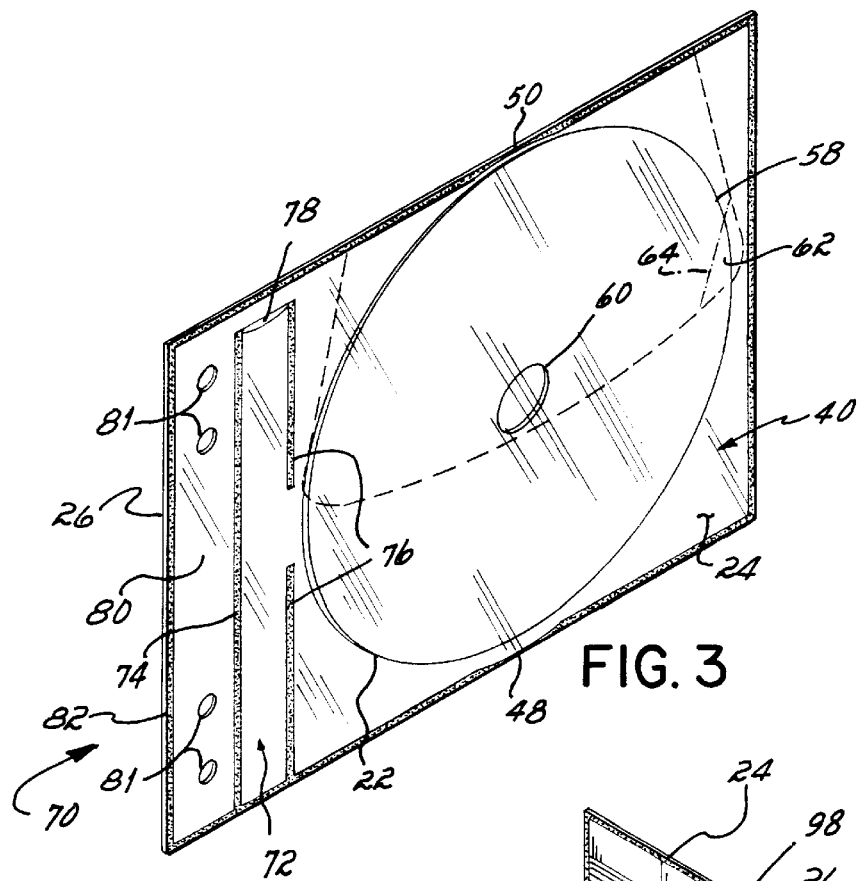
FIG. 3 is a front perspective view of a second embodiment of the container with a CD scaled inside.

The line of weakness 44 defining the flap 46 in the first flexible sheet 24 is distinguished by the shape of the cut near the ends 52. As shown in FIG. 1, the line of weakness 44 has arcuate regions 54 adjacent the ends 52. The arcuate regions 54 tend to resist tearing of the first flexible sheet 24 when the flap 46 is pulled away from the compact disc 22, as shown in FIG. 1A. This is especially important upon initial breaking of the perforations of the line of weakness 44, which is likely to require greater opening force on the flap 46 than would typically be required once the perforations have already been broken. The arcuate regions 54 in the line of weakness 44 tend to distribute the opening force more evenly along a hinge line 56 between the ends 52 of the line of weakness 44, as opposed to a line of weakness which terminates at ends lying along the direction of the force used for opening the flap, which would tend to focus the opening force more directly on the terminal ends of the line of weakness and therefore be more susceptible to additional undesired tearing of the flap. Additionally terminating the line of weakness 44 with the arcuate regions 54 displaced some slight distance away from the peripheral edge 36 of the container 20 assists in providing resistance to opening the flap 46 after the perforations have been broken. This resistance provides a "memory" which facilitates the closings of the flap 46 and tends to keep the flap 46 in a closed position to better prevent infiltration of dust or other foreign material into the container 20 during after-market storage of a compact disc 22. Alternatively, however, it has been found that the arcuate regions 54 may be omitted and the terminal ends 52 of the line of weakness 44 may be located slightly inward of the joint between the first and second flexible sheets 24 and 26 along the peripheral edge 36 (FIG. 3). This alternative arrangement still provides satisfactory "memory" of the flap 46 so as to tend to keep the flap 46 in a closed position.

The flap 46 is shaped so as to allow access to edge 58 and aperture 60 of the compact disc 22 simultaneously, or alternatively either to the edge 58 at two points sufficiently distant to permit removal of the compact disc or to the front and obverse of the aperture 60 without contacting the optical surface 30. Although the arcuate regions 54 are shown in FIG. 1 as curving inwardly toward or within the flap 46, the arcuate regions 54 alternatively may curve outwardly away from the flap 46. Advantageously, the arcuate regions 54 extend through an arc of about 90 degrees to about 270 degrees, with about 180 degrees being preferred. The arc is defined as originating at a point tangent to the line of weakness 44 as it approaches the adjacent peripheral edge 36. Preferably, the arcuate regions 54 and the ends 52 of the line of weakness 44 lie some distance from the peripheral edge 36 of the container 20.

To facilitate initial breaking of the perforations and opening of the flap 46, the line of weakness 44 adjacent the widest part of the flap 46 is completely cut to define a tab 62 which may be grasped and pulled upward to begin the opening process. Advantageously, the tab 62 includes a living hinge line 64.

As an alternative to the line of weakness 44 defining a flap 46, other line of weakness configurations may be used to create a disc-removing opening in the first sheet 24. For instance, the container may be provided with a perforated line extend, between the seal lines 34 and 38, or between the seal lines 32 and 36, such that upon breaking the perforations, a disc-removing opening is created in the sheet 24.

The first and second flexible sheets 24 and 26 may be joined by thermal welding, such as by radiation with radio frequency (RF) energy or by other means which effects a local partial melting of the sheets in contact with one another, by ultrasonic welding, or by adhesive or chemical modification. When the sheets are polypropylene, it is presently preferred to join them by ultrasonic welding. Joining the sheets along the peripheral edges 32, 34, 36, and 38 by ultrasonic welding introduces less distortion such as waviness in the sheets than when they are joined by thermal welding techniques, and does not require additional materials such as adhesives or chemicals.

Figure 2:
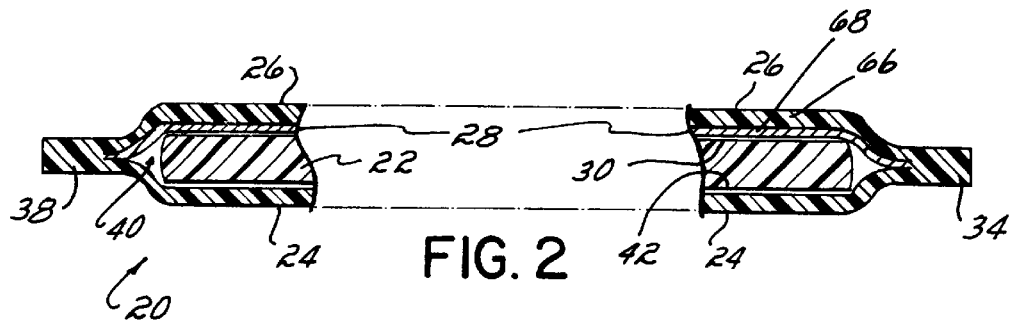
FIG. 2 is a cross-sectional view taken along line 2—2 of FIG. 1.

The first flexible sheet 24 is preferably polypropylene. The second flexible sheet 26 is advantageously a laminate of an opaque polypropylene film 66 bonded to a nonwoven polypropylene fabric 68 (FIG. 2). Alternatively, the second flexible sheet 26 may be constructed in a non-laminated fashion, such as by treating one side of a nonwoven fabric web, as by thermal melting or chemical modification, to fuse the fibers together at the surface so as to present a substantially smooth surface which is not susceptible to snagging, without affecting the opposite nonwoven surface of the fabric web.

A storage container in accordance with the principles of this invention may also include a graphics storage area for retaining identifying graphics. FIG. 3 depicts a second embodiment of a container 70 which includes a graphics storage area 72 formed from a continuation of the first flexible sheet 24 and second flexible sheet 26 and bounded by a joint line 74 typically formed by thermal or ultrasonic welding and a seal line 76 which defines one of the sealed edges of the disc-receiving area 40. As shown in FIG. 3, the seal line 76 may be interrupted in the vicinity of the widest part of the flap 46 so that the seal line 76 may be located closer to the disc-receiving area 40 and thereby minimize the width of the container 70. Furthermore, although the joint line 74 and the seal line 76 are shown as substantially continuous, they may alternatively be discontinuous, such as in the form of dashed lines or the like. The graphics storable area 72 is accessible through a slit 78 in the first flexible sheet 24, although the slit 78 could alternatively be formed in the second flexible sheet 26. The graphics storage area 72 is dimensioned so as to accept the spine graphics from a conventional jewel box compact disc container; for example, the graphics storage area 72 is about 12.3 centimeters long and about 0.8 centimeters wide. If the storage container 70 is to be dedicated to the storing of a particular compact disc, identifying graphics could alternatively be stamped or printed on the first flexible sheet 24 in the region of the graphics storage area 72, in which case the joint line 74 and slit 78 could be eliminated if desired.

As shown in FIG. 3, the container 70 advantageously also includes an end region 80 along edge 82 adjacent the graphics storage area 72 which may be hole-punched (as shown) or otherwise utilized to allow the container 70 to be stored in a storage system. Although the end region 80 is shown in connection with the container 70 which includes the graphics storage area 72, it will be appreciated that the end region 80 may advantageously be employed as well with the container 20 of FIG. 1 which does not include a graphics storage area 72.

Figure 4:
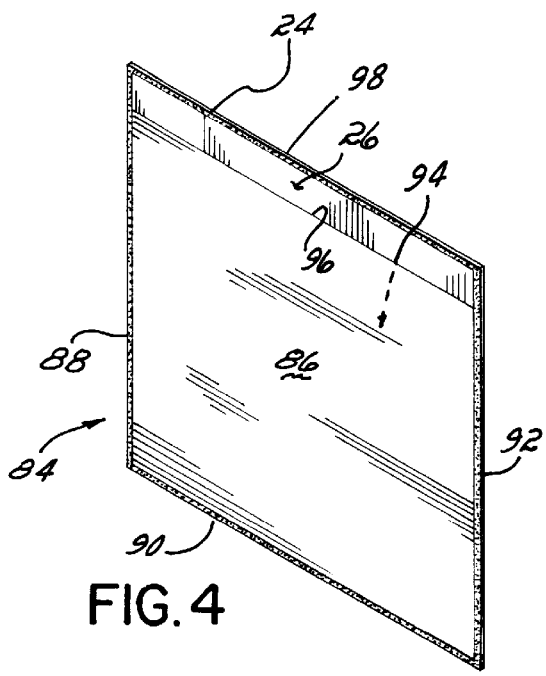
FIG. 4 is a rear perspective view of a third embodiment of the container including a back graphics storage pocket.

As shown in FIG. 4, a storage container 84 in accordance with the principles of the present invention optionally may include a third flexible sheet 86 joined to the second flexible sheet 26 on the side opposite the first flexible sheet 24. The third flexible sheet 86 is joined to the second flexible sheet 26 along only three peripheral edges 88, 90, and 92 to define a pocket 94 for storing graphics material. Advantageously, the unjoined fourth peripheral edge 96 of the third flexible sheet 86 is staggered inward with respect to the edge 98 of the container 84 adjacent to the fourth peripheral edge 96 in order to facilitate insertion of graphics material into the pocket 94 and further to permit the third flexible sheet 86 to be joined to the second flexible sheet 26 prior to or simultaneously with the sealing of the first and second flexible sheets 24 and 26 along the edges 88, 90, and 92. The third flexible sheet 86 may be composed of polypropylene, polyethylene, or vinyl. Although the container 84 does not include a graphics storage area 72 or end region 80, it will be appreciated that a graphics storage area 72 and/or an end region 80 may be added to the container 84.

Any of the compact disc containers 20, 70, and 84 is intended for use both as an original storage and shipping container for a compact disc 22 and as an after-market storage container. Any of the containers 20, 70, and 84 can be enclosed in packaging presently used to display compact discs at music stores. Because the containers 20, 70, and 84 are relatively thin in comparison with jewel boxes, packaging can be produced which requires less space, permitting a greater number of packages to be displayed in the same amount of space. For a standard 12 centimeter diameter compact disc, the dimensions of the container 20 shown in FIG. 1 which does not include a graphics storage area along one edge of the container are about 13.3 centimeters wide and about 12.8 centimeters high. When the graphics storage area 72 is included, the width increases to about 14.3 centimeters, and when the graphics storage area 72 and the end region 80 are both included as in the container 70 shown in FIG. 3, the width increases to about 15.7 centimeters.

By virtue of the perforated flap 46 and the completely sealed edges as discussed above, the containers 20, 70, and 84 substantially prevent infiltration of foreign material into the disc-receiving area 40 during original storage and shipping of a compact disc. Moreover, the compact disc 22 is prevented from slipping out of the container during original storage and shipping because all of the edges of the container are sealed. Further, even after the flap 46 has been partially separated from the remainder of the first sheet 24, the containers provide protection against infiltration of foreign material into the disc-receiving space 40 and inadvertent loss of the compact disc 22, by virtue of the design of the flap 46 which tends to keep the flap in a closed position as previously noted.

II. Apparatus and Method for Making Disc Containers

Figure 5:
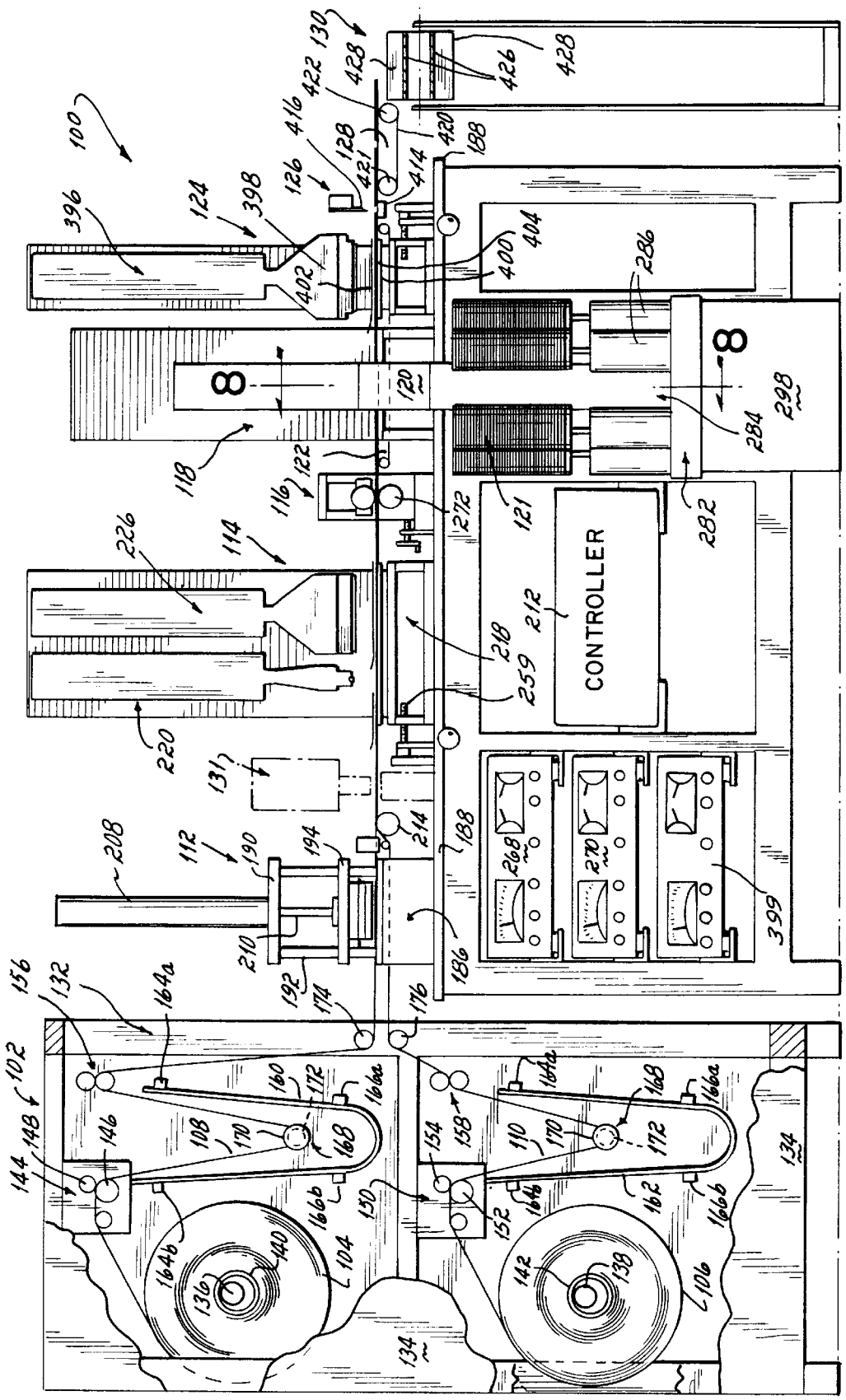
FIG. 5 is a schematic representation of a front view of an apparatus for manufacturing containers as depicted in FIGS. 1–3.

An apparatus 100 for manufacture of compact disc storage containers in accordance with the principles of the present invention is shown schematically in FIG. 5. The apparatus 100 includes an unwinder 102 which provides support for rolls 104 and 106 of a first web 108 and a second web 110, respectively, a die cut press 112 which forms lines of weakness in the first web, a first sealing station 114 which seals together the first and second webs along a line generally parallel and adjacent to first longitudinal edges (i.e., along the direction of travel) of the webs and along one or more transverse lines (i.e., generally perpendicular to the direction of web travel) to create a series of interconnected containers each having a disc-receiving area, a nip roll indexer 116 which intermittently advances free ends of the webs 108 and 110 an index distance I (FIG. 16B) equal to at least a width dimension of a compact disc storage container, a disc insertion station 118 including a disc inserting apparatus 120 which transports a disc from a disc supply 121 and inserts the disc between the webs 108 and 110 within the disc-receiving area, a vacuum conveyor 122 which assists in advancing the webs 108 and 110, a second sealing station 124 which seals together the first and second webs 108 and 110 along a line generally parallel and adjacent to second longitudinal edges of the webs 108 and 110 to close each of the containers after insertion of a disc, a separating station 126 which separates a prior container from a succeeding container, and an exit conveyor 128 which transports separated containers away from the separating station 126. Advantageously, the apparatus 100 also includes an accumulating conveyor 130 which receives containers from the exit conveyor 128 and accumulates the containers in bundles where they may be off-loaded by an operator for further handling, operations such as packaging the bundles for shipment to a customer. As shown in FIG. 5, the apparatus 100 may optionally include a conventional foil stamper 131 for stamping indicia on the web 108. While the foil stamper 131 is illustrated as being downstream of the die cut press 112, it could alternatively be located upstream of the die cut press 112 or in any other suitable location.

The unwinder 102 includes a frame 132 which has a generally vertical surface 134 on which is supported a pair of generally horizontal rods or supports 136 and 138 vertically spaced apart. First support 136 engages the inner hub 140 of roll 104 of first web 108 and second support 138 engages the inner hub 142 of roll 106 of second web 110, so as to permit the rolls 104 and 106 to rotate freely about the supports 136 and 138, respectively. Mounted on the vertical surface 134 at a higher vertical level than first support 136 and spaced from first support 136 by an amount greater than the diameter of the roll 104 is a first nip roll driver 144 including a first drive roller 146 and a first pressure roller 148. The first web 108 is engaged in the nip defined between the outer surfaces of the first drive roller 146 and first pressure roller 148, and is advanced by rotation of the first drive roller 146 in conventional manner. Similarly, a second nip roll driver 150 including a second drive roller 152 and a second pressure roller 154 is mounted on vertical surface 134 at a higher vertical level than second support 138 and spaced from second support 138 by an amount greater than the diameter of the roll 106 for advancing the second web 110 by rotation of the second drive roller 152. The drive rollers 146 and 152 are independently rotatably driven by a pair of drive motors (not shown) which are controlled to drive the drive rollers 146 and 152 so as to maintain the tension in the first and second webs 108 and 110 substantially independent of the inertia of the rolls 104 and 106.

To this end, the unwinder 102 further includes a first magnetic induced torque resistance nip roller mounted on the vertical surface 134 at about the same vertical level as the first drive roller 146, and a second magnetic induced torque resistance nip roller 158 mounted at about the same vertical level as the second drive roller 152. The webs 108 and 110 pass over the magnetic nip rollers 156 and 158 after exiting the nip roll drivers 144 and 150, respectively. Between the nip roll drivers 144 and 150 and the magnetic nip rollers 156 and 158, the webs 108 and 110 reside within deep U-shaped troughs 160 and 162, respectively. Each of the troughs 160 and 162 has an upper pair of photoelectric sensors 164a and 164b mounted adjacent its upper open end and a lower pair of photoelectric sensors 166a and 166b mounted adjacent its lower closed end. Each trough has windows (not shown) formed in its generally vertical side walls in the vicinity of the optical sensors 164a,b and 166a,b so that there is a free line of sight between each sensor 164a and corresponding sensor 164b and between each sensor 166a and corresponding sensor 166b. Associated with each trough 160 and 162 is a generally dumbbell-shaped weight 168 of a predetermined mass which includes enlarged opposite ends 170 and a cylindrical portion 172 therebetween which rests on an upper surface of the first web 108 or second web 110, as the case may be. The drive rollers 146 and 152 are driven to advance the webs 108 and 110, respectively, so as to keep each weight 168 generally between the upper photoelectric sensors 164a,b and the lower photoelectric sensors 166a,b, in a manner which is well known in the art of continuous length web handling. Thus, the tension of each web 108 and 110 at the exit of the nip roll drivers 146 and 150 is maintained substantially independent of the inertia of the rolls 104 and 106, the tension being a function primarily of the magnetic drag of the magnetic nip rolls 156 and 158.

Figure 6:
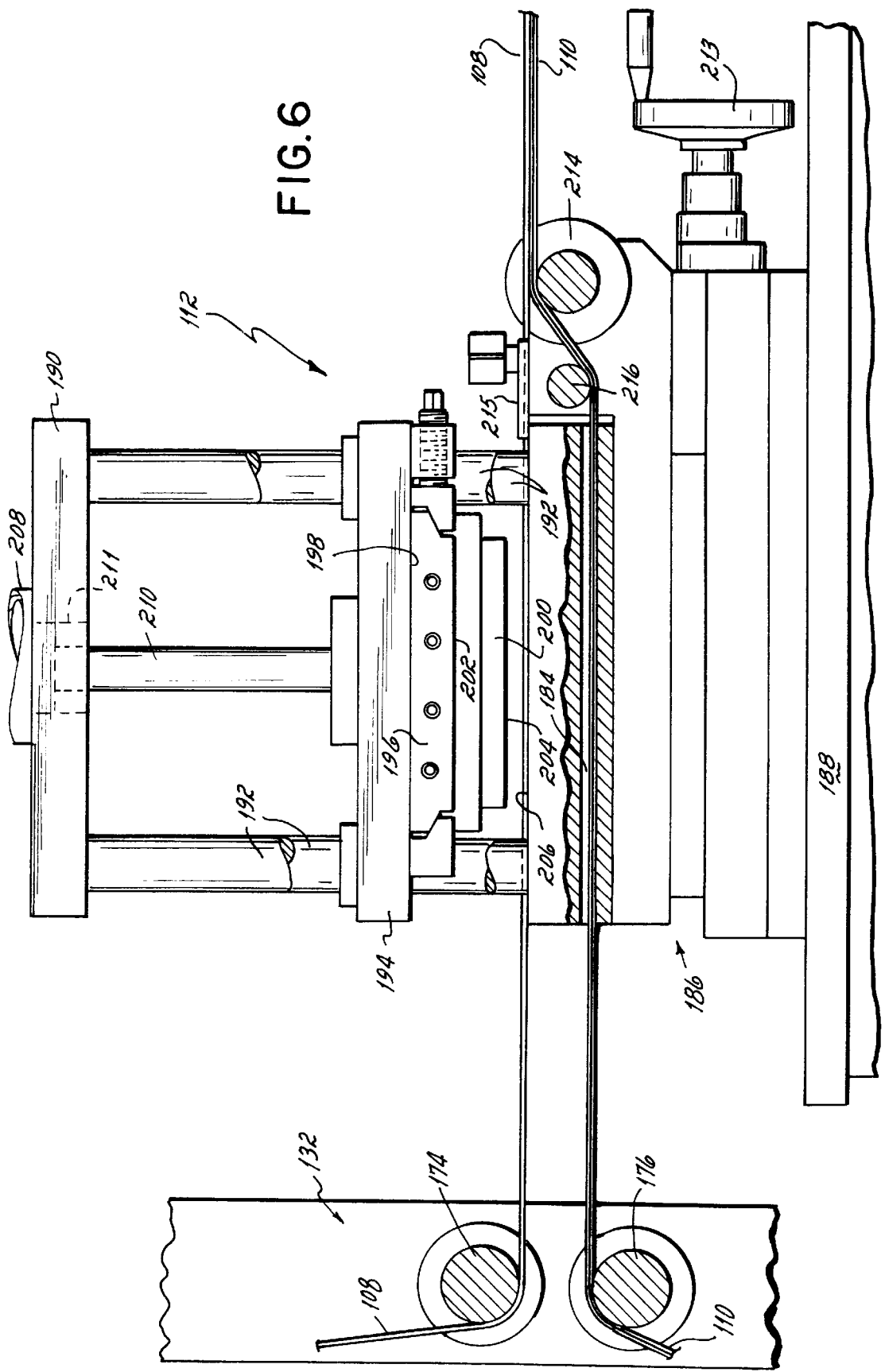
FIG. 6 is a schematic front view of the die cut press of the apparatus.

The unwinder 102 further includes first and second guide rollers 174 and 176 mounted on the unwinder frame 132 adjacent an edge of the frame closest to the die cut press 112. The webs 108 and 110 pass around the guide rollers 174 and 176, respectively, just before exiting the unwinder 102. As best seen in FIG. 6, the guide rollers 174 and 176 are vertically aligned with one another and are vertically spaced apart by a spacing distance which is selected to present the first and second webs 108 and 10 to the die cut press in substantially parallel relation vertically spaced apart to correspond approximately to the vertical distance between the webs as they pass through the die cut press 112.

After the webs 108 and 110 exit the unwinder 102, they pass through the die cut press 112. The first web 108 advantageously comprises a clear or transparent material and is processed in the apparatus 100 to form the first sheet 24 of the containers 20, 70, and 84 depicted in FIGS. 1–4, and the second web 110 advantageously comprises a material having a nonwoven upper surface (i.e., the surface facing the first web 24) and is processed in the apparatus to form the second sheet 26 of the containers 20, 70, and 84. However, the order of the webs 108 and 110 could be reversed with relatively minor modifications to the apparatus 100, which modifications would be within the ability of persons of ordinary skill in the art.

With reference to FIG. 6, the die cut press 112 includes a lower stationary member 186 which is supported on a support table 188 of the apparatus 100, an upper stationary member 190 generally vertically aligned with the lower stationary member 186, four cylindrical guide rods 192 secured between the lower stationary member 186 and upper stationary member 190 in substantially vertical orientations spaced apart and parallel to one another, a reciprocating member 194 generally vertically aligned with the stationary members 186 and 190 which reciprocatingly slides up and down on the guide rods 192, a die plate 196 supported on a lower surface 198 of the reciprocating member 194, and a cutting die 200 supported on a lower surface 202 of the die plate 196 and having a lower surface 204 adapted to cut the first web 108 when the first web 108 is sandwiched between the lower surface 204 of the cutting die 200 and a working surface 206 of the lower stationary member 186.

Reciprocating motion is imparted to the reciprocating member 194 by a pneumatic cylinder 208 vertically mounted on the upper stationary member 190 and having a slidable piston rod 210 which extends through a hole 211 through the upper stationary member 190 and is attached at its lower end to the reciprocating member 194. The pneumatic cylinder 208 is actuated by compressed air delivered from a compressed air source (not shown) to drive the reciprocating member 194 from an upper starting position as shown in FIG. 5, in which the cutting die 200 is disengaged from the first web 108, downward to bring the cutting die 200 into engagement with the first web while the first web 108 is momentarily stationary. The control of the die cut press 112 in synchronization with the motion of the webs 108 and 110 is accomplished by a controller 212 including a computer which operates the various components of the apparatus 100 via software which simulates the action of mechanical cams. The operation of the controller 212 is discussed in detail below in connection with FIG. 20.

The lower stationary member 186 includes passage 184 through which the second web 110 passes so that the second web 110 is isolated from the cutting die 200 and thus passes through the die cut press 112 unchanged. However, as previously noted, the die cut press 112 could be modified so that both webs 108 and 110 pass between the cutting die 200 and the working surface 206, with the cutting die 200 performing a cut on the first web 108 without affecting the nonwoven surface of the second web 110, as is well known in the art.

The second web 110 emerges from the passage 184 and passes around a guide roller 214 and a guide roller 216 which are mounted on the lower stationary member 186 at approximately the same vertical level. Thus, upon emerging from the passage 184, the second web 110 is carried by the guide roller 214 and the guide roller 216 upward toward the first web 108. Upon emerging from the die cut press 112 after the cutting operation is performed upon the first web 108, the first web 108 passes through a web guide 218 which orients the first web 108 transversely so as to become co-linear with the second web 110 as the second web begins to pass around the guide roller 214. The guide roller 214 is selectively positionable in the transverse direction (i.e., normal to the direction of travel of the webs) to adjust the transverse location of the webs 108 and 110 with respect to the other stations of the apparatus 100. Furthermore, the entire die cut press 112 is selectively positionable in the longitudinal direction (i.e., in the direction of web travel) by the manipulation of hand wheel 213, within a suitable range of motion to allow adjustment of the location of the die cut press 112 with respect to the other stations of the apparatus 100 and thereby adjust the relative longitudinal position of a line of weakness formed in the first web 108 with respect to other features of a container such as longitudinal and transverse seal lines produced in the sealing stations 114 and 124.

Figure 7:
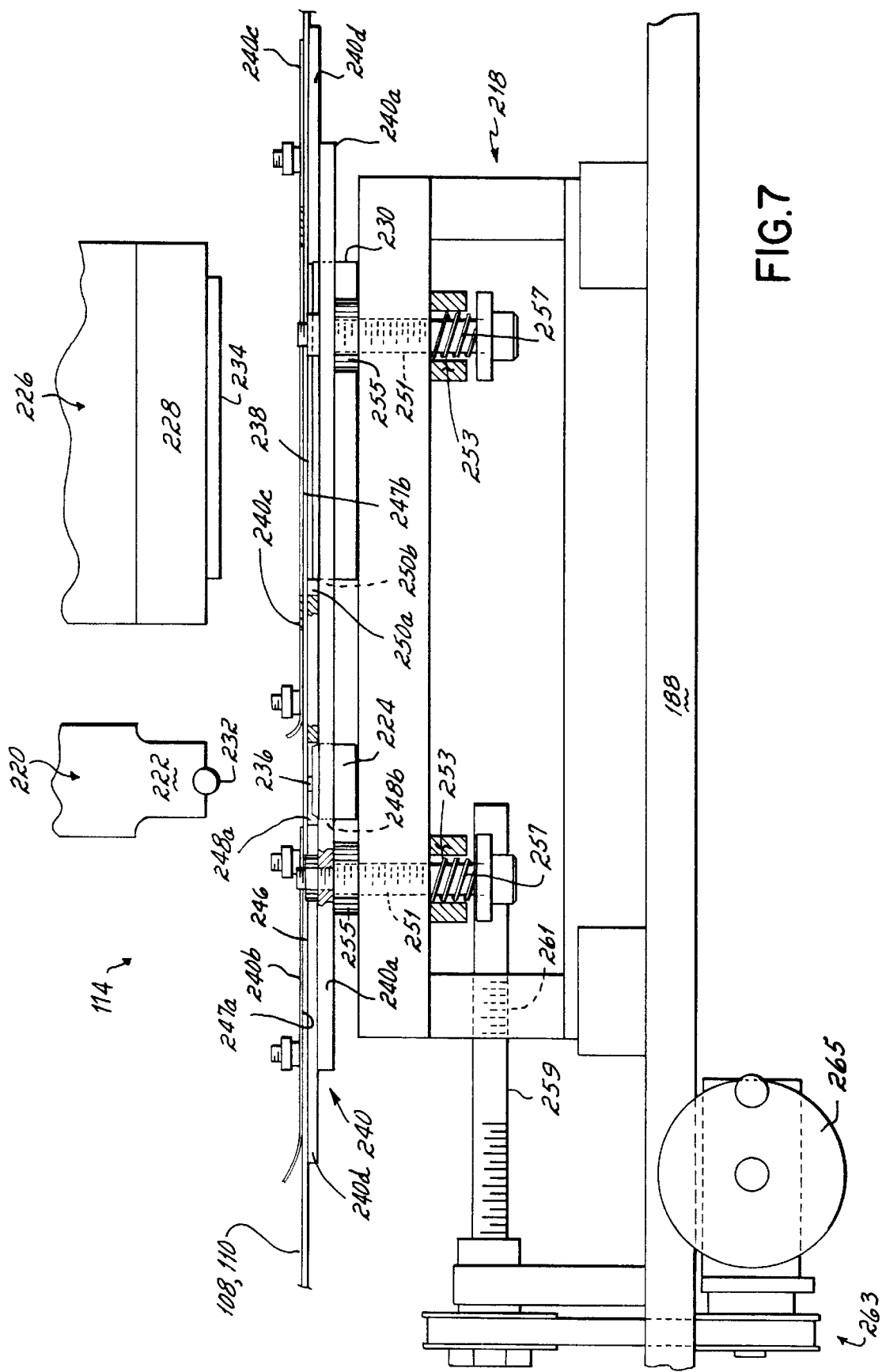
FIG. 7 is a front view partially in cross section of the first sealing station of the apparatus, showing in particular the stripper plate assembly.

After emerging from the die cut press 112, the webs 108 and 110 enter the first sealing station 114, which is shown in FIG. 7. The first sealing station 114 includes a base 218 supported on the support table 188, a first ultrasonic welder 220 having a first welding head 222 mounted for vertically reciprocating motion with respect to the base 218, a cooperating first ultrasonic anvil 224 supported on the base 218, a second ultrasonic welder 226 having a second welding head 228 mounted for vertically reciprocating motion with respect to the base 218 independently of the first ultrasonic welding head 222, and a cooperating second ultrasonic anvil 230 supported on the base 218. The first and second ultrasonic welding heads 222 and 228 have first and second working surfaces 232 and 234, respectively, facing the ultrasonic anvils 224 and 230. The first and second ultrasonic anvils 224 and 230 have first and second working surfaces 236 and 238, respectively, vertically aligned with the first and second working surfaces 232 and 234 of the first and second ultrasonic welding heads 222 and 228, respectively. Each of the first and second ultrasonic welding heads 222 and 228 is intermittently driven in synchronization with the movement of the webs 108 and 110 to engage and compress the webs between the working surfaces 232 and 234 of the welding heads and the working surfaces 236 and 238 of the ultrasonic anvils while the webs are momentarily stationary. While the webs 108 and 110 are engaged and compressed between the welding heads 222 and 228 and the anvils 224 and 230, ultrasonic energy is directed from each welding head to its corresponding anvil, causing localized melting and fusing of the webs 108 and 110 in regions corresponding to the working surfaces 236 and 238 of the anvils, in known manner.

The first sealing station 114 further includes a stripper plate assembly 240 through which the webs pass, the stripper plate assembly 240 being movably mounted on the base 218 so that after the welding operations have been performed by the first and second welders 220 and 226, the stripper plate assembly 240 is actuated to move upward with respect to the base 218 so as to pull the webs away from the ultrasonic anvils 224 and 230. The stripper plate assembly 240 includes a base plate 240a which supports a pair of upper stripper guide plates 240b and 240c and a lower stripper guide plate 240d. The webs 108 and 110 as they pass through the first sealing station 114 pass between an upper surface 246 of the lower stripper guide plate 240d and a lower surface 247a of the upper stripper plate 240b, and between the upper surface 246 of lower stripper guide plate 240d and a lower surface 247b of the upper stripper guide plate 240c. The upper stripper guide plates 240b and 240c are secured to the lower stripper guide plate 240d by fasteners. The lower stripper guide plate 240d includes a window 248a and the base plate 240a similarly includes a window 248b, the windows 248a and 248b framing the first anvil 224 to permit the webs 108 and 110 to be engaged between the welding head 222 and anvil 224. The lower stripper guide plate 240d and base plate 240a also include windows 250a and 250b, respectively, which frame the second anvil 230. The upper stripper guide plates 240b and 240c cover substantially the entire lower stripper guide plate 240d except in the regions of the windows 248a and 250a. Alternatively, a single upper stripper guide plate could be made with windows corresponding to the windows 248a and 250a in the lower stripper guide plate 240d. Advantageously, the working surfaces 236 and 238 of the anvils lie at a vertical level approximately 0.015 inch above that of the upper surface 246 of the lower stripper guide plate 240d.

The base plate 240a is movably attached to the support base 218 by fasteners 251 which extend vertically upward through spring retainers 253 secured to the support base 218, through holes in the support base 218, through nuts or spacers 255 which space the base plate 240a vertically above the upper surface of the support base 218, and through holes in the base plate 240a. Compression springs 257 are captively contained by the spring retainers 253 between enlarged heads of the fasteners 251 and the lower surface of the support base 218. Upon completion of the welding operations by both the first and second ultrasonic welders 220 and 226, the welding heads 222 and 228 begin their upward movement to disengage from the webs 108 and 110 and shortly thereafter the stripper plate assembly 240 is driven upwardly a slight amount by pneumatic actuators (not shown), such as approximately 0.25 inch, thereby pushing the webs 108 and 10 upwardly away from the ultrasonic anvils 224 and 230. The springs 257 return the stripper plate assembly 240 to its starting position upon deactivation of the pneumatic actuators. Thus, if the second web 110 has become adhered to any portions of the working surfaces 236 and 238 of the anvils, the stripper plate assembly 240 will strip the second web 110 free of the anvils so that the webs 108 and 110 may be advanced to the next station of the apparatus 100.

The entire first sealing station 114 may be selectively positioned longitudinally within a limited range of motion with respect to the other stations of the apparatus 100 by virtue of a threaded adjustment screw 259 which is received in a threaded hole 261 in support base 218 and connected via a belt and pulley assembly 263 to an adjustment wheel 265. Turning the adjustment wheel 265 in one direction thus causes the threaded adjustment screw 259 to rotate and advance the support base 218 in the upstream longitudinal direction, and turning the wheel 265 the other direction causes the support base 218 to be advanced in the downstream direction. The support base 218 is movably supported on the support table 188 to permit the support base 218 to move longitudinally while being constrained not to move transversely or vertically.

Figure 16A:
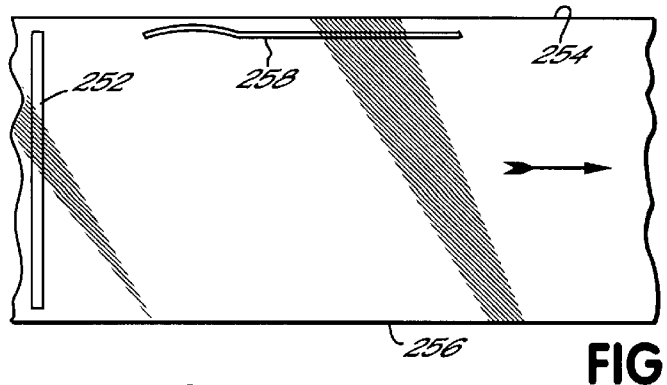
FIGS. 16A–C are illustrative top plan views of the webs showing the seal lines formed in the first sealing station through a sequence of three successive operations of the first sealing station, in making the containers depicted in FIG. 1.
Figure 16B:
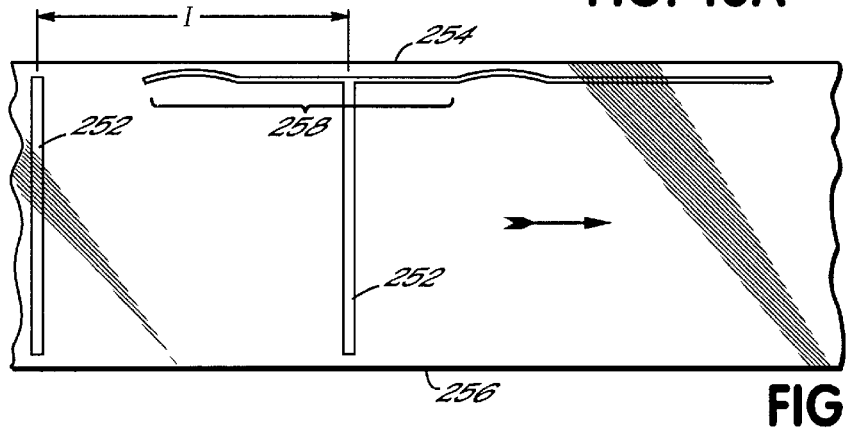
Figure 16C:
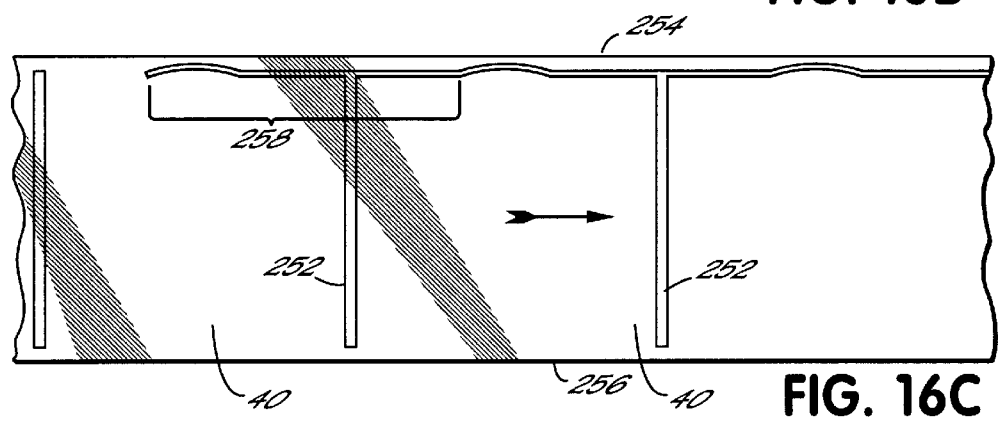

The working surfaces of the welding heads 222 and 228 and anvils 224 and 230 may be variously configured to produce various shapes and numbers of seal lines in the webs 108 and 110. For instance, FIGS. 16A–C schematically depict seal line configurations suitable for manufacturing containers 20 as described above in connection with FIG. 1. The working surfaces 232 and 236 of the first welding head 222 and anvil 224 are adapted to seal the webs together along a single transverse seal line 252 generally perpendicular to the longitudinal edges 254 and 256 of the webs (i.e., generally perpendicular to the direction of web travel). The working surfaces 234 and 238 of the second welding head 228 and anvil 230 are adapted to seal the webs together along a first longitudinal seal line 258 adjacent and generally parallel to the first longitudinal edges 254 of the webs. Although for making generally rectangular containers such as container 20, the seal lines 252 and 258 are generally straight and orthogonal, other container shapes may be made as noted above. For example, a container with rounded edges may be made by forming generally longitudinal seal lines that are curved at the ends and generally transverse seal lines that are curved at the ends. Thus, as used herein and in the appended claims as applied to a seal line, the term "generally longitudinal" means primarily in a longitudinal direction (the direction of web travel) even though there may be some transverse component of the seal line, and the term "generally transverse" means primarily in a transverse direction (perpendicular to the direction of web travel) even though there may be some longitudinal component of the seal line. It is to be understood that although FIGS. 16A–C and 18A–C schematically depict both inward and outward edges of the longitudinal seal lines 258 and 406 as being indented away from the disc 22 with the outward edges of those seal lines spaced inward from the web edges 254 and 256, it is presently preferred to locate the outward edges of the seal lines 258 and 406 substantially at the respective web edges 254 and 256 and to indent only the inward edges of the seal lines 258 and 406 away from the disc.

The second ultrasonic welder 226 advantageously is located downstream of the first ultrasonic welder 220 which forms the transverse seal lines 252. Performing the longitudinal welding, downstream of the transverse welding further is believed to be beneficial in preventing distortion of the webs which may result from web "camber" (i.e., non-straight longitudinal edges). Furthermore, it is advantageous to stagger the longitudinal seal line 258 with respect to the transverse seal line 252 so that each longitudinal seal line 258 ends approximately midway between two successively formed transverse seal lines 252, as shown in FIGS. 16A–C. Although the embodiment depicted in FIGS. 16A–C shows the seal line 258 made by second ultrasonic welder 226 located such that the longitudinal midpoint of the longitudinal seal line 258 is approximately one index distance I downstream of the transverse seal line 252 made by first ultrasonic welder 220, it will be appreciated that the first and second ultrasonic welders could be separated by approximately one and one-half times the index distance I, twice the index distance I, three times the index distance I, etc. It will also be appreciated that were the first and second ultrasonic welders 220 and 226 are separated by several index distances, other operations could be performed on the webs between the first and second ultrasonic welders 220 and 226. For example, the nip roll indexer 116, the die cut press 112, or the insertion station 118, could be located between the first and second ultrasonic welders. However, the particular arrangement illustrated in FIG. 5 is advantageous in keeping the total length of the apparatus 100 from the die cut press 112 to the separating station 128 is short as possible, which is desirable for minimizing the effects of web camber on the location and alignment of the webs transversely.

Figure 18A:
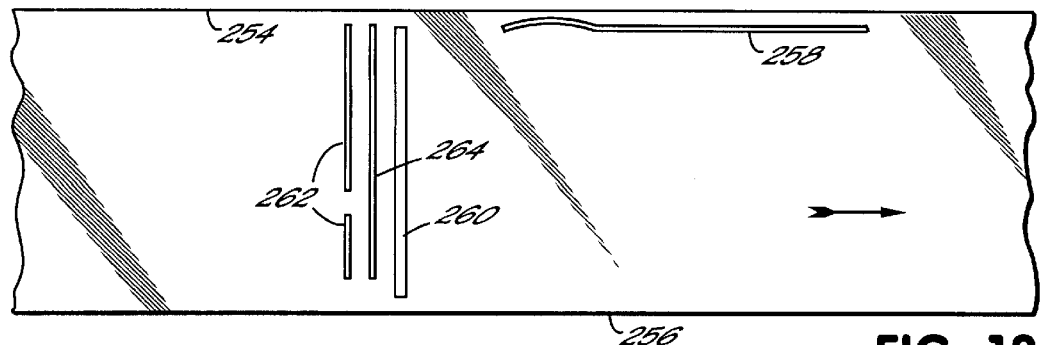
FIGS. 18A–C are illustrative top plan views of the webs showing the seal lines formed in the first sealing station through a sequence of three successive operations of the first sealing station, in making the containers depicted in FIG. 3.
Figure 18B:
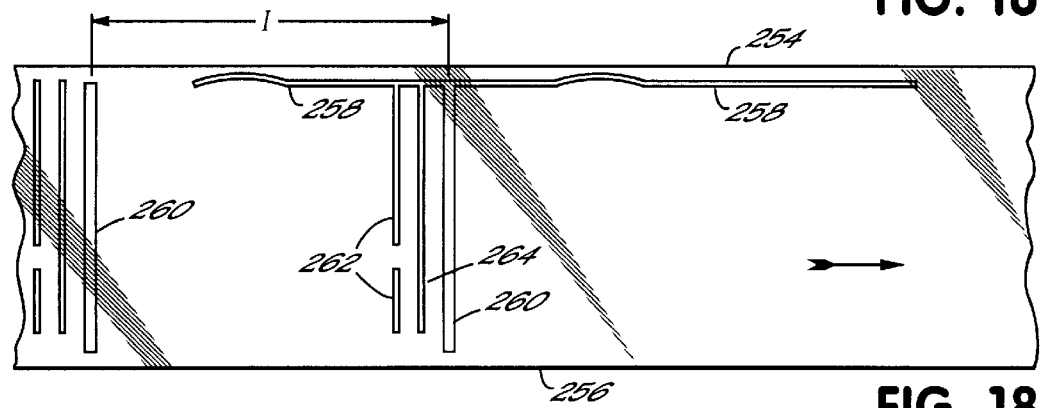
Figure 18C:
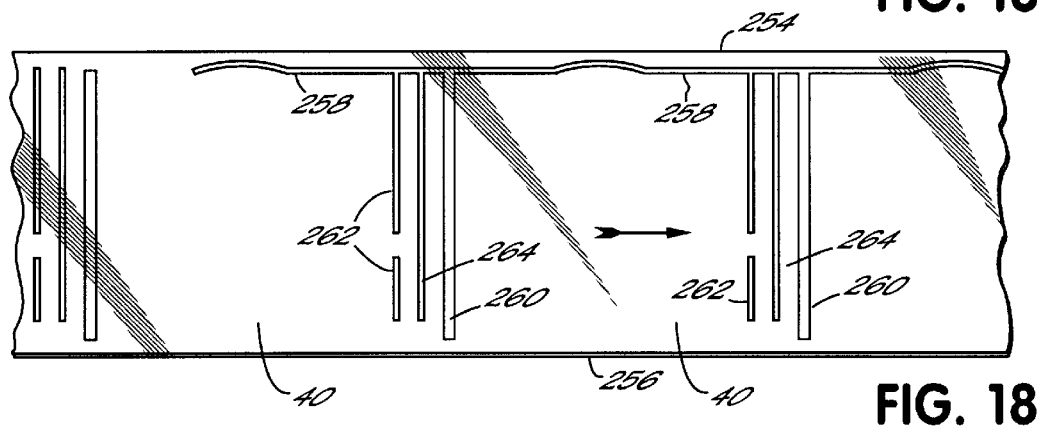
Figure 19:
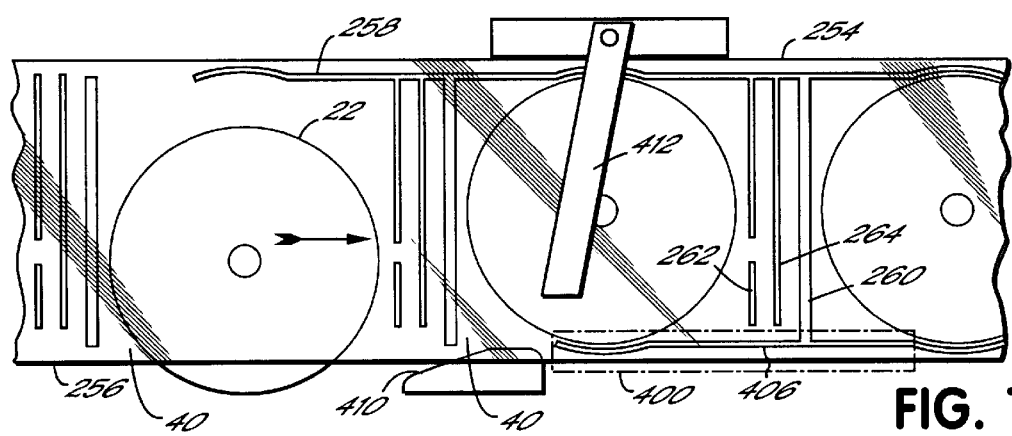
FIG. 19 is an illustrative top plan view of the webs similar to FIG. 17, where containers as depicted in FIG. 3 are being made.

FIGS. 18A–C schematically depict the various seal lines which are produced by several successive operations of suitably configured first and second welders in manufacturing containers 70 as described above in connection with FIG. 3. The webs are joined alone three longitudinally spaced transverse seal lines 260, 262, and 264 and along a first longitudinally seal line 258 adjacent and generally parallel to first longitudinal edges 254 of the webs. As previously noted, the second ultrasonic welder 226 advantageously is located downstream of the first ultrasonic welder 220 which forms the transverse seal lines and is staggered with respect thereto. The first transverse seal line 260 is cut in the center at the separating station 126 to form a sealed edge of one container 70 (indicated as edge 82 in FIG. 3) and the opposite sealed edge of a preceding container 70 (i.e., the edge nearest the flap tab 62 in FIG. 3), and the second transverse seal line 262 forms a sealed edge 76 of the disc-receiving area 40 of container 70 as well as one boundary of the graphics storage area 72 (FIG.3). The third transverse seal line 264 forms the joint line 74 which defines the other boundary of the graphics storage area 72 as described above in connection with FIG. 3. The third transverse seal line 264 may be omitted if no graphics storage area 72 is to be provided, or if graphics are to be stamped or printed on the exterior of the first web 108 between the first and second transverse seal lines 260 and 262. If no provision for graphics is to be included in the region adjacent the second transverse seal line 262, then the third transverse seal line 264 may be omitted and the spacing between the first and second transverse seal lines 260 and 262 may be reduced.

The region between the first and third transverse seal lines 260 and 264 forms the end region 80 as described above in connection with FIG. 3. The end region 80 may be hole-punched in a later station such as the separating station 124, or may otherwise be utilized, to permit the container 70 to be stored in a storage system.

Energy is supplied to the ultrasonic welders 220 and 226 and the welders are pneumatically actuated to reciprocate by a pair of welding controllers 268 and 270 (FIG. 5). In known manner, the controllers 268 and 270 control the amount of time that the working surfaces of the welding heads and anvils are in engagement with the webs and the amount of time that the welding head is energized so that each welder imparts a predetermined amount of energy to the webs so as to assure that each weld is properly formed. Suitable ultrasonic welders 220 and 226 include the 900 Series 20 kHz welders available from Branson, Inc of Danbury, Conn.

Figure 15:
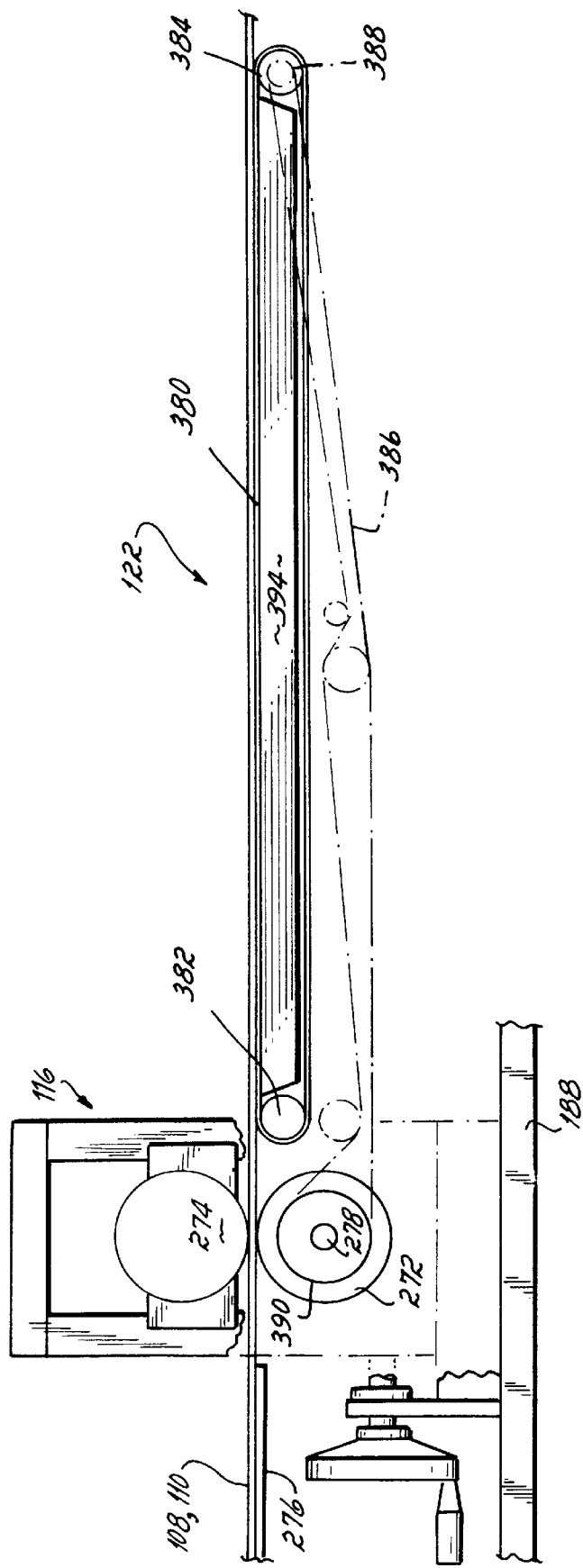
FIG. 15 is a schematic front view of the disc conveyor including the nip roll indexer and the vacuum conveyor.

With reference to FIG. 15, upon emerging from the first sealing station 114, the webs 108 and 110 enter the nip roll indexer 116, which intermittently advances the webs through the apparatus 100. The nip roll indexer 116 includes a horizontal drive roller 272 mounted in the path of the webs 108 and 110, and a horizontal pressure roller 274 mounted vertically above the drive roller 272. The pressure roller 274 is rotatably driven by the drive roller 272 through a gear arrangement (not shown) connected therebetween. The drive roller 272 and pressure roller 274 define a nip through which the webs pass. The pressure roller 274 is releasably mounted so that it may be raised to facilitate threading of the webs through the nip roll indexer 116. The nip roll indexer 116 further includes a horizontal guide plate 276 located upstream of the drive and pressure rollers at about the same vertical level as the nip between the drive and pressure rollers, the guide plate terminating just upstream of the nip between the drive roller and pressure roller. The guide plate 276 helps maintain the webs 108 and 110 flat as they enter the nip roll indexer 116, and also positions the webs transversely. The transverse position of the guide plate 276 advantageously is adjustable.

The drive roller 272 is mounted on the shaft 278 of a stepper motor (not shown). The stepper motor intermittently drives the drive roller 272 to advance the webs 108 and 110 an index distance I (FIG. 16B) equal to at least a width of a container, which typically is at least slightly greater than the diameter of the discs to be stored in the containers. Where the webs are advanced a distance which exceeds a container width, there is necessarily waste material between successively formed containers. Advantageously, however, the nip roll indexer 116 advances the webs a distance equal to precisely a container width, so that there is no waste material between successive containers.

After exiting the nip roll indexer 116, the webs enter the disc insertion station 118. With reference to FIGS. 5 and 8–14, the disc insertion station 118 includes a disc inserting apparatus 120 located to one side of the web path and a disc supply 121. The supply 121 is adapted to hold several stacks of discs. A disc transfer assembly (to be described) intermittently transports discs from a stack and inserts them one at a time between the webs 108 and 110 within the intermittently advancing disc-receiving areas 40 (FIGS. 16C and 17) of the webs. The disc supply 121 includes a rotatable horizontal turntable 282 which has a vertical elevator assembly 284 mounted in the center thereof, and a plurality of cylindrical spindle supports 286 mounted on the turntable 282 radially outboard of the elevator assembly 284 and equally spaced circumferentially. Each spindle support 286 releasably holds a spindle assembly 288 which includes a lower platter 290 and a spindle 292 which extends centrally through the platter 290 such that the spindle 292 extends upward from the platter 290 generally perpendicular thereto. The spindle 292 is cylindrical along most of its length, having a diameter slightly smaller than the central apertures of the discs. The upper end 294 of each spindle is tapered to facilitate removal of discs from the spindles. The turntable 282 is rotatably driven by a pair of pneumatic cylinders (not shown) mounted on support base 298 of the inserting apparatus. A conventional ratchet and pawl mechanism (not shown) permits the turntable 282 to be locked into preselected rotational positions and secured against further rotation in one direction. The elevator assembly 284 includes a vertically movable elevator 285 which has a horizontal arm 285*a* which engages the lower platter 290 so as to raise the entire stack of discs to a predetermined vertical level so that the topmost disc may be accessed by a disc transfer assembly now to be described.

The inserting station 118 further includes a disc transfer assembly 316 supported in a cantilever fashion above the support table 188. The disc transfer assembly 316 includes a pickup arm 318 rotatably mounted at its midpoint on a horizontal support member 320. One end of the pickup arm 318 has depending therefrom a vacuum-operated pickup head 322*a* and the other end of pickup arm 318 similarly has a pickup head 322*b*, each pickup head including at least one and preferably a plurality of downwardly directed vacuum cups 324. The pickup heads 322*a* and 322*b* are vertically movable with respect to the arm 318. The vacuum cups 324 of each pickup head 322*a* and 322*b* are connected via passages (not shown) through the pickup head to a vacuum source (not shown) which is controlled by the controller 212 to apply vacuum to the vacuum cups 324 when the pickup head is picking up a disc from a stack and carrying the disc to the disc inserter 325 of the inserting apparatus. Each pickup head 322 also has a spring-biased centering cone (not shown) centrally mounted on the pickup head and depending therefrom between the vacuum cups, for engaging the tapered end 294 of a spindle 292 so that the spindle 292, and hence the disc 22, is centered with respect to the pickup head 322.

The pickup arm 318 is rotatable through at least 180 degrees of arc by a pneumatic piston-driven rotary actuator 323 and is located with respect to the turntable 282 so that each pickup head 322 may be rotated into a position substantially vertically aligned with a spindle 292 which is in an operative position, whereupon, for example, the pickup head 322*a* is lowered to engage the topmost disc 22 on the spindle 292. Any slight misalignment of the pickup head 322*a* with respect to the spindle 292 is corrected by the aforementioned centering cone before the vacuum cups 324 contact the disc 22. With vacuum applied to the vacuum cups 324, the pickup head 332*a* is then raised to remove the topmost disc 22 from the spindle 292, and then the pickup arm 318 is rotated through about 180 degrees of arc. The pickup head 322*a* is then lowered to bring the disc 22 into engagement with a rest 328 of the disc inserter 325 located adjacent the webs 108 and 110, and vacuum is released to cause the pickup head 322*a* to release the disc 22. At the same time that the pickup head 322*a* is lowered to deposit the disc 22 onto the rest 328, the other pickup head 322*b* is lowered to engage the topmost disc 22 on the spindle 292 and vacuum is applied to the vacuum cups 324 on pickup head 322*b*. The pickup heads 322*a* and 322*b* are then raised and the pickup arm 318 is rotated around so that the disc on pickup head 322*b* may be deposited on the rest 328, and so forth. Thus, during continuous operation of the apparatus 100, the disc transfer assembly 316 deposits a disc 22 onto the rest 328 after each 180 degree rotation of the pickup arm 318.

The disc inserter 325 is now described with reference to FIGS. 8–14. The disc inserter 325 functions to take a disc deposited onto the disc rest 328 by the disc transfer assembly 316 and move that disc into a position between the webs 108 and 110. The disc rest 328 is formed of a cylindrical base member 330 whose diameter is greater than the diameter of a disc aperture 60 and a generally cylindrical disc pilot or hub 332 mounted atop the base member 330, the diameter of the hub 332 being slightly smaller than a disc aperture 60. The upper end of the hub 332 is preferably formed as a tapering involute so that the hub 332 may penetrate a disc aperture 60 without interference with the inner edges of the aperture. The base member 330 has a pair of quad rings 334 (FIG. 13) retained in circular grooves (not shown) in its upper surface encircling the hub 332 so that the quad rings protrude upwardly from the upper surface to form a non-marring surface on which the optical surface 30 of a disc rests when the disc is deposited onto the rest 328 by either pickup head 322a or 322b. The base member 330 may be provided with a vacuum passage 340 (FIGS. 9 and 13) which has an opening between the quad rings 334 connected to a vacuum source (not shown) so that vacuum may be applied to a disc to assist in retaining the disc on the rest 328.

Figure 8:
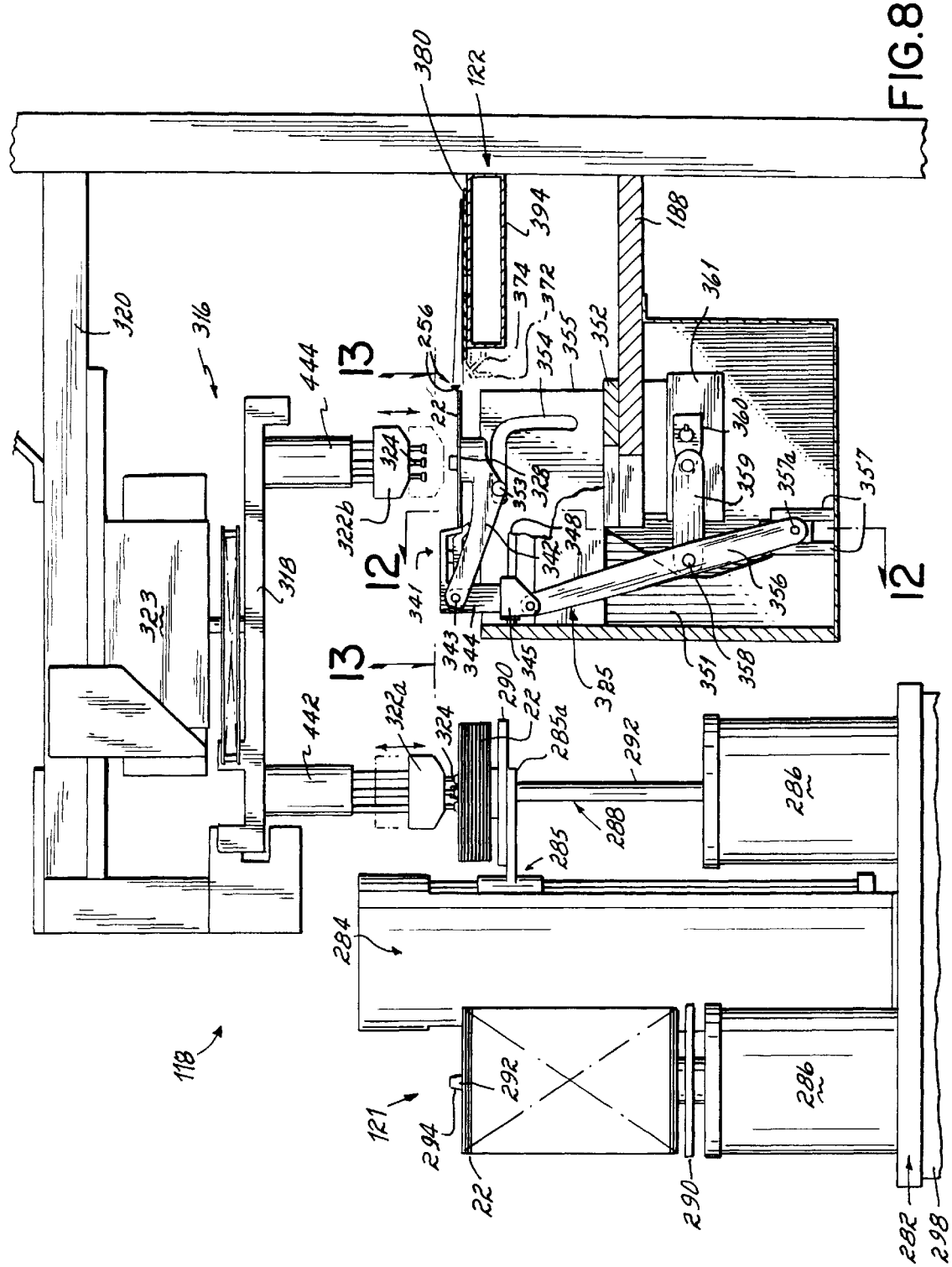
FIG. 8 is a cross-sectional view of the disc insertion station of the apparatus taken on line 8—8 of FIG. 5, showing the disc inserter in its home position after a disc has been deposited on the disc inserter by the disc transfer assembly.
Figure 10:
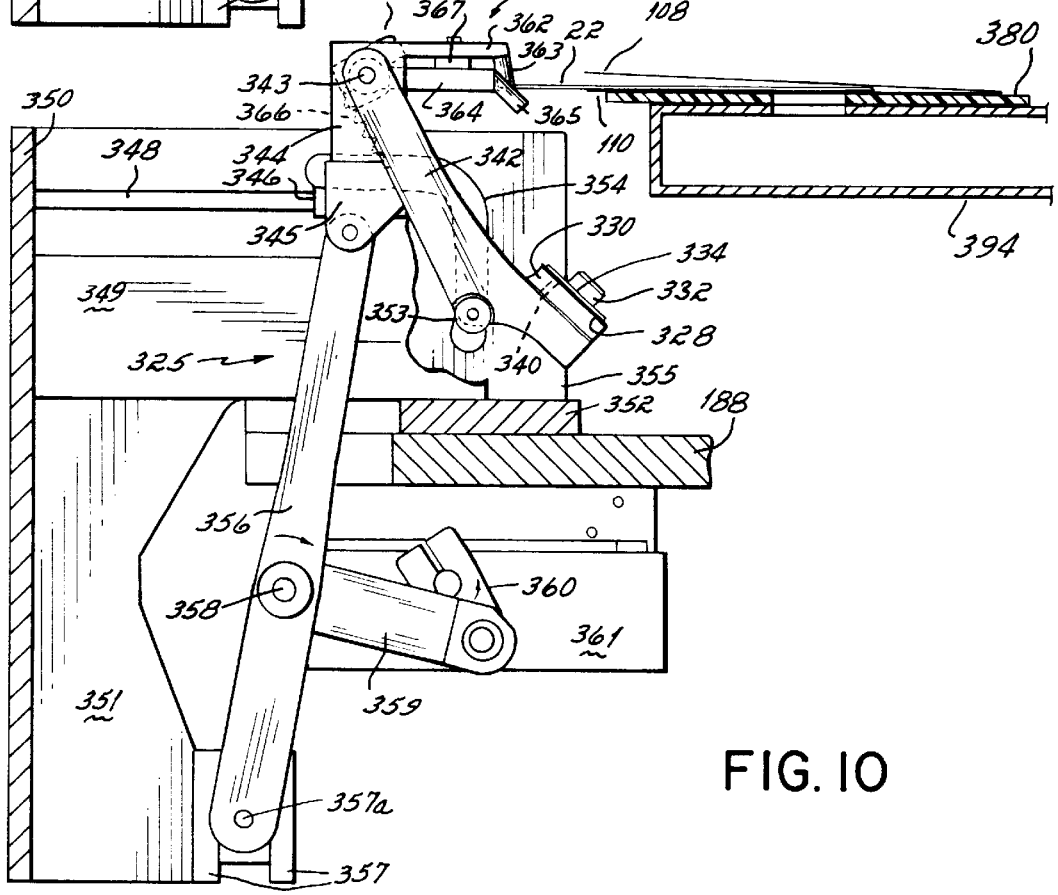
FIG. 10 is a view similar to FIG. 9, showing the disc inserter in a still further advanced position.
Figure 11:
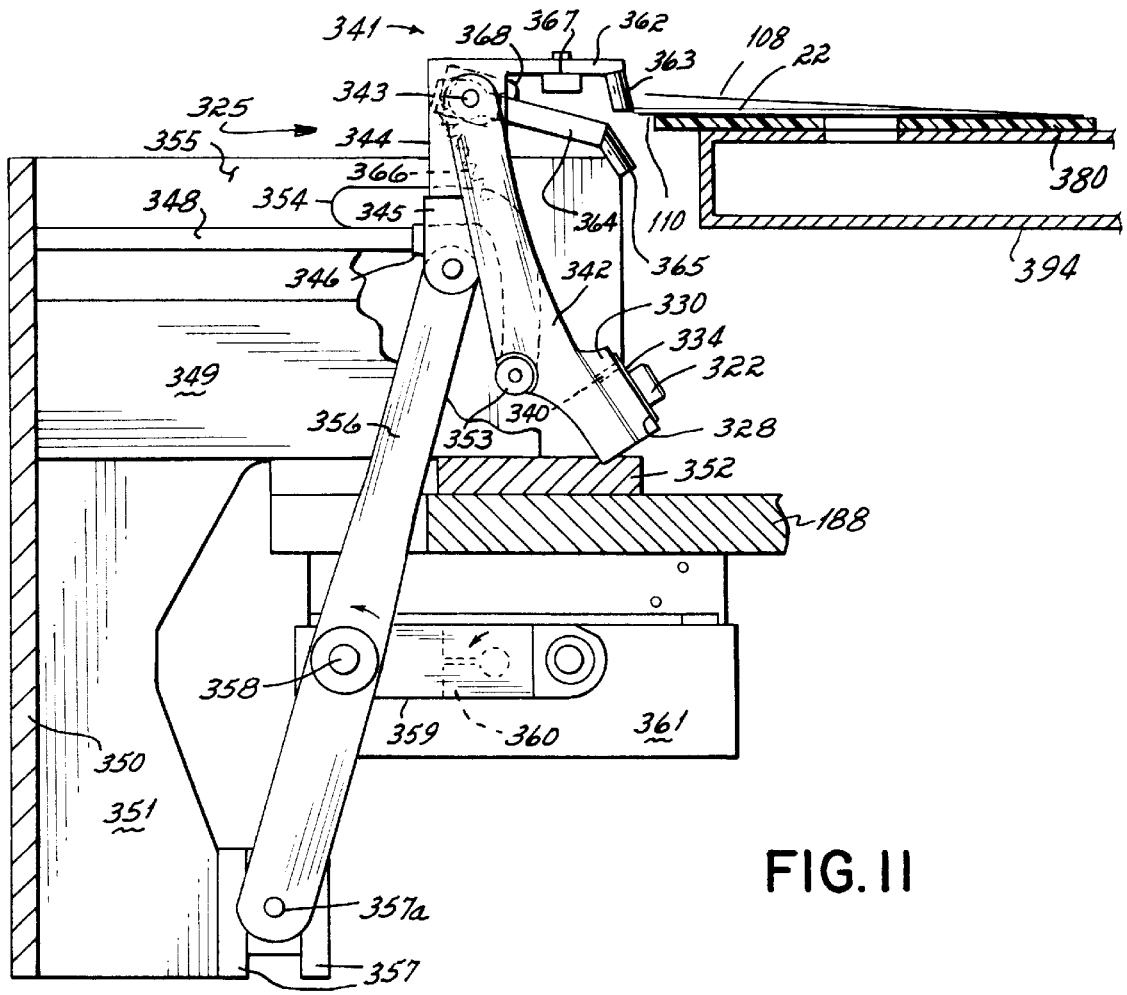
FIG. 11 is a view similar to FIGS. 9 and 10, showing the disc inserter in its fully advanced position in which the disc has been substantially completely inserted between the webs.
Figure 14:
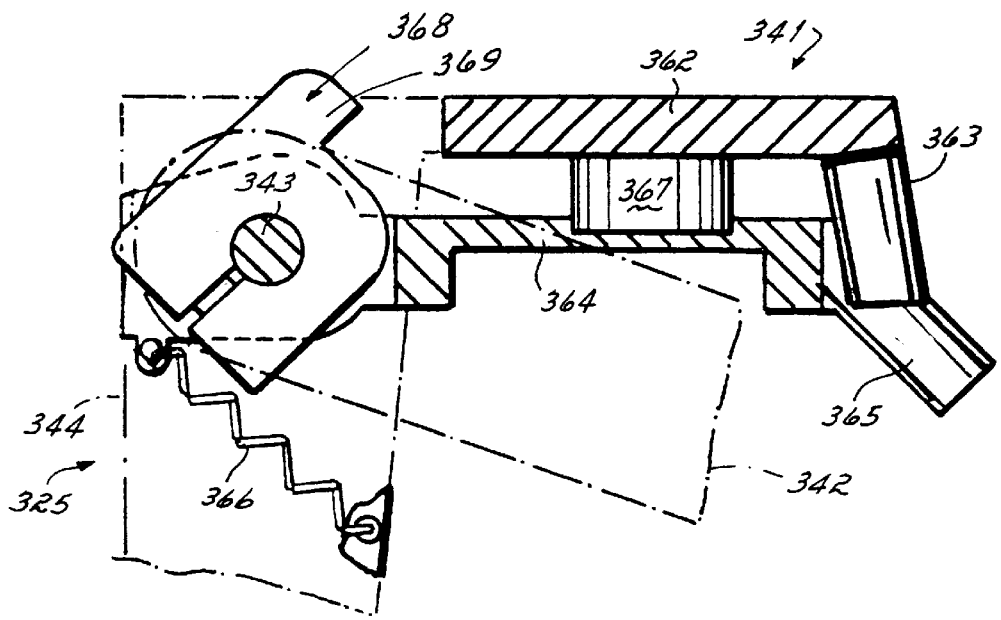
FIG. 14 is a cross-sectional view taken on line 14—14 of FIG. 13.
Figure 12:
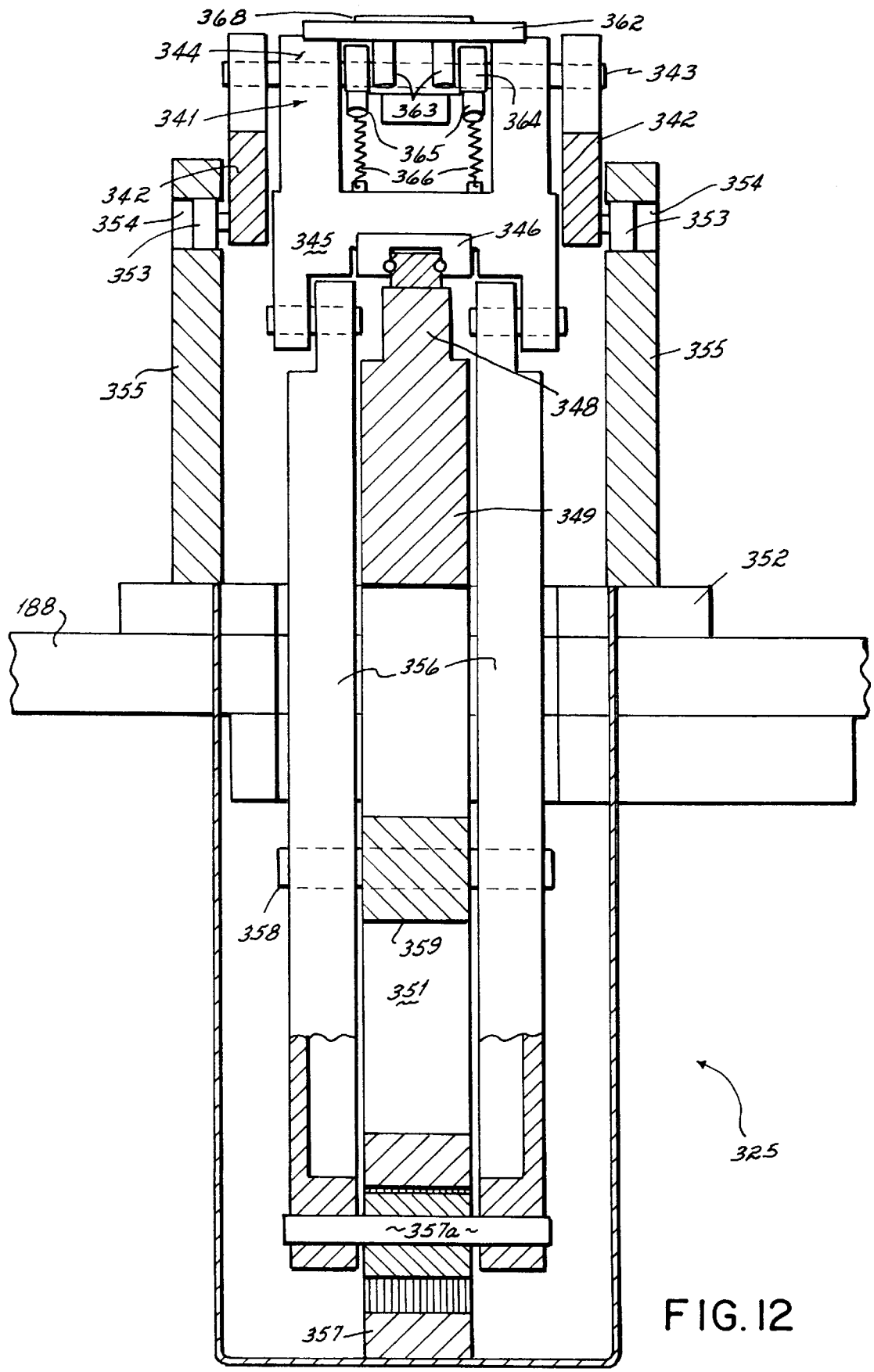
FIG. 12 is a cross-sectional view taken on line 12—12 of FIG. 8.
Figure 13:
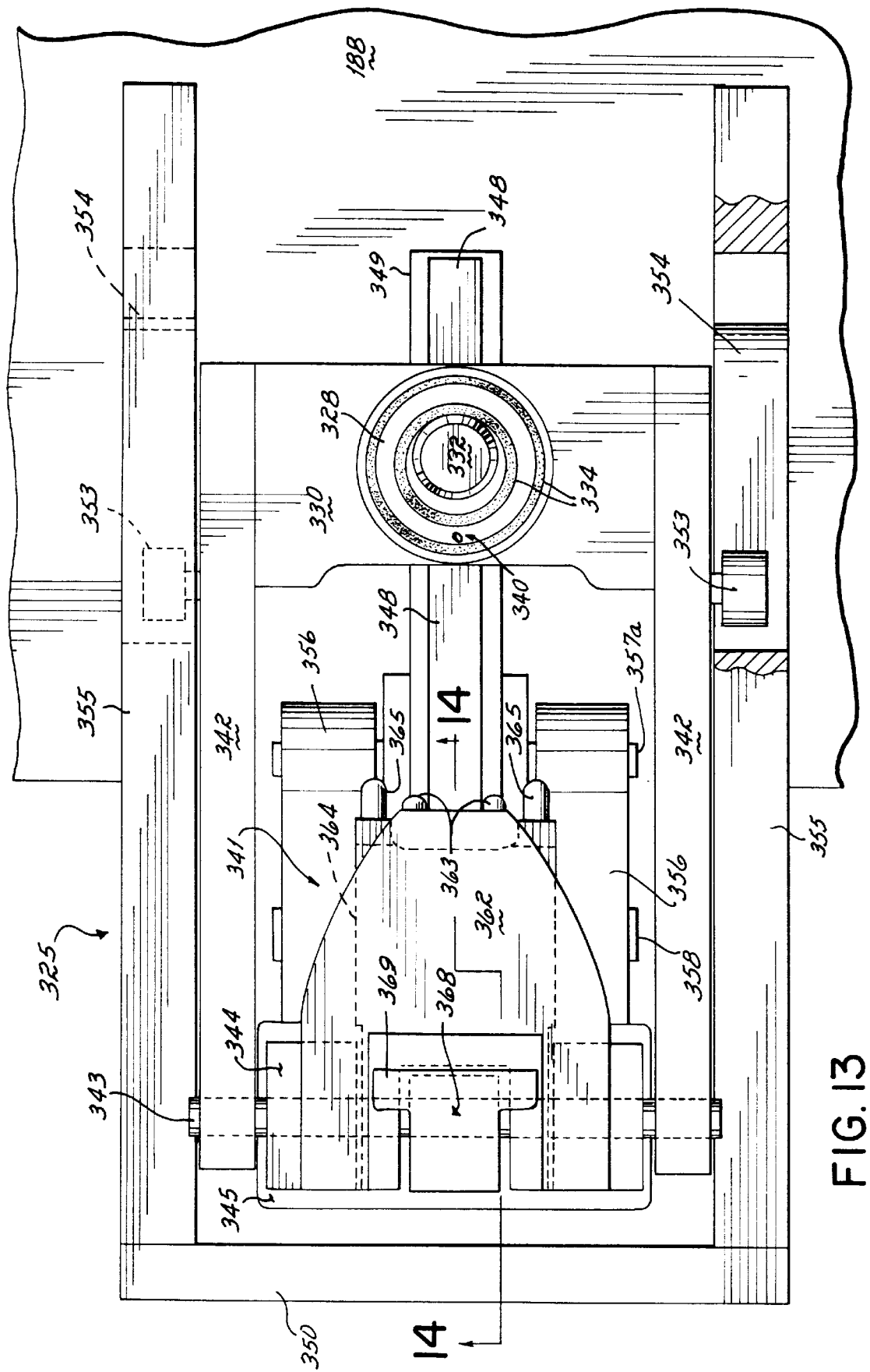
FIG. 13 is a cross-sectional view taken on line 13—13 of FIG. 8.

The rest 328 is configured and located so that a disc 22 on the rest 328 is at substantially the same vertical level as the upper surface of the vacuum conveyor 122 in the vicinity of the insertion station 118, as shown in FIG. 8. The disc transport mechanism 325 is moveable via a mechanical linkage described below from a first position in which the hub 332 is in substantial vertical alignment with a pickup head 322a or 322b as the pickup head descends to deposit a disc onto the rest 328 (FIG. 8), to a second position representing a horizontal translation of the disc toward the webs 108 and 110 in which the edge 58 of the disc closest to the webs 108 and 110 is partially inserted between the webs 108 and 110 into the disc-receiving area 40 and the disc rest 328 just begins to undergo a rotational movement to disengage the hub 332 from the disc aperture (FIG. 9), to a third position representing a combined translation and rotation of the rest 328 in which rest 328 drops down to fully disengage the hub 332 and base member 330 from the disc and a pusher assembly 341 pushes the disc further into the disc-receiving area 40 (FIG. 10), to a fourth and final position in which the pusher assembly 341 has pushed the disc fully between the webs (FIG. 11).

The translational and rotational motions of the disc rest 328 and pusher assembly 341 are accomplished by a cam and cam follower arrangement. The disc rest 328 is connected on opposite sides thereof to first ends of a pair of spaced apart mounting arms 342. The second ends of the mounting arms 342 are pivotally connected via a pivot pin 343 to a pair of spaced apart pivot links or blocks 344 which mount an attachment block 345 therebetween. A ball slide assembly 346 is fixed within the block 345 to horizontally slide along a horizontal rail 348 supported by side plates 349. The plates 345 are fixed to a vertical frame member 350 and support plates 351 which depend from a base plate 352 supported on the support table 188.

Figure 9:
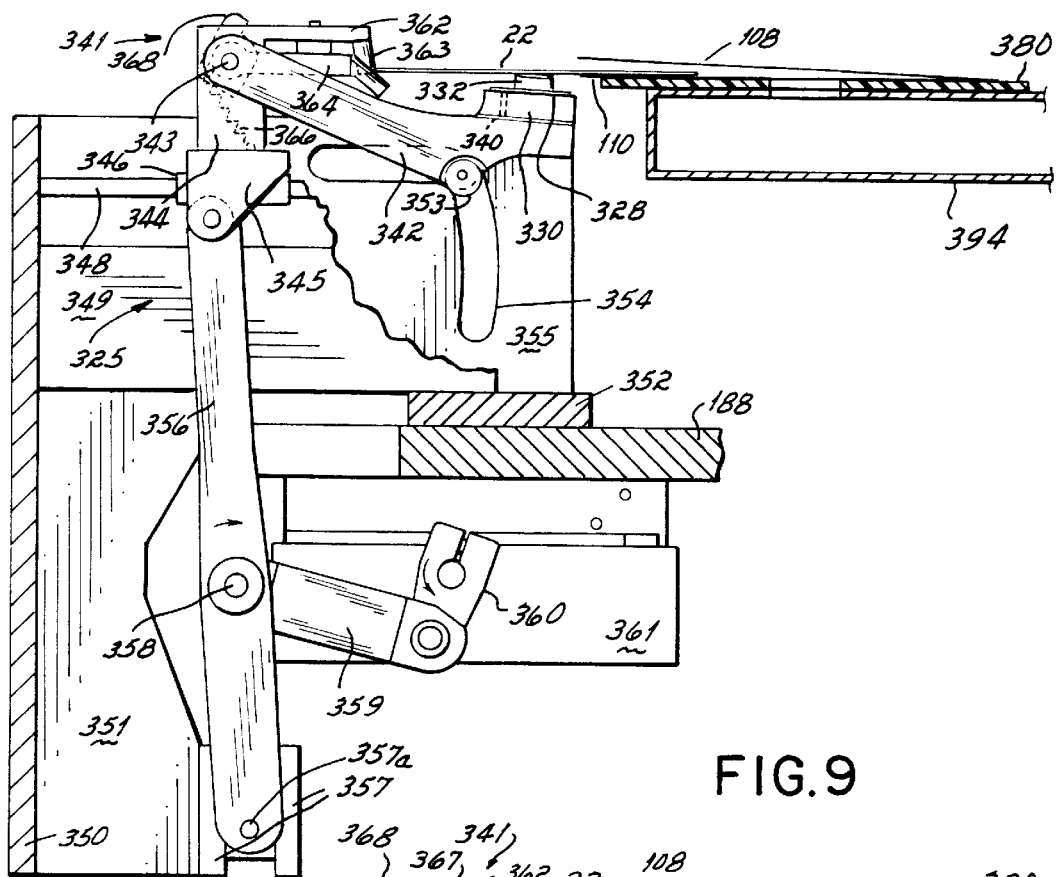
FIG. 9 is a fragmentary cross-sectional view similar to FIG. 8 of the disc inserter which moves a disc into a disc-receiving area between the webs, showing the disc inserter in an intermediate advanced position in which the disc has been partially inserted between the webs.

Cam followers 353 are rotatably mounted in a horizontal position on each of the two mounting arms 342 so that the cam followers 353 are constrained to remain within a pair of cam tracks 354 formed in a pair of generally vertical cam plates 355 which are supported on the base plate 352 substantially parallel to one another and spaced apart so that the disc rest 328 with its mounting arms 342 are between the two cam plates 355. The cam tracks 354 are substantially identical and generally L-shaped, each having a horizontal portion extending toward the support table 188 generally normal to the direction of web travel and a generally vertical portion which descends from the end of the horizontal portion closest to the support table 188. As shown in FIGS. 8–11, as the cam followers 353 progress along the cam tracks 354 from a "home" position in which the disc rest 328 is vertically aligned with a pickup head 322, toward the support table 188, the disc rest 328 is first moved in a pure horizontal translation as the cam followers 353 traverse the horizontal portions of the cam tracks 354. FIG. 9 depicts the disc inserter after the cam followers 353 have traversed the entire horizontal portions of the cam tracks 354 and have just started to enter the generally vertical portions. FIGS. 10 and 11 then depict the positions of the disc inserter at two points along the vertical portions of the cam tracks 354.

Horizontal motion is imparted to the mounting arms 342 to carry the cam followers 353 along the cam tracks 354 by a pair of lever arms 356 which have their upper ends pivotally attached to the attachment block 345 on either side of the horizontal rail 348 which supports block 345 having the ball slide assembly 346, and their lower ends pivotally attached to a vertically floating pivot mechanism 357a supported between a pair of spaced apart plates 357 supported by the support plates 351. The lever arms 356 are pivotally attached by a pivot pin 358 therebetween to one end of a link 359. The other end of the link 359 is pivotally attached to a crank 360 of a rotary actuator 361 supported by the support table 188. Thus, a 360 degree rotation of the crank 360 causes the link 359 to swing the lever arms 356 back and forth from a starting or "home" position as depicted in FIG. 8, to an ending position as shown in FIG. 11, and then back to the home position.

The pusher assembly 341 is now described with reference to FIGS. 8–14. The pusher assembly 341 includes a mounting plate 362 which is supported in cantilever fashion by the pivot blocks 344, with the mounting plate 362 extending toward the disc rest 328. Depending from the edge of the mounting plate 362 nearest the disc rest 328 are a pair of spaced apart cylindrical pins 363 which are oriented with their longitudinal axes about 5 degrees from vertical with the upper ends of the pins 363 being tilted away from the disc rest 328. Adjacent their lower ends, the pins 363 contact the edge of a disc on the disc rest 328. The pins 363 act to push the disc in a horizontal direction to insert it between the webs.

The pusher assembly 341 further includes a support arm 364 which is pivotally mounted on the pivot pin 343 to which the disc rest mounting arms 342 are attached and extends outward therefrom toward the disc rest 328. The support arm 364 is located generally between the lever arms 356. The support arm 364 has a pair of pins 365 depending from its end nearest the disc rest 328, each of the pins 365 having its longitudinal axis oriented about 45 degrees from vertical, with its upper end tilted away from the disc rest 328. When the inserter is in its home position as shown in FIG. 8 and for the beginning portion of the insertion cycle as shown in FIGS. 9 and 10, the support arm 364 is biased by a pair of extension springs 366 to remain in a horizontal position with an upper surface of the arm 364 abutting a rubber bumper 367 secured to the bottom of the mounting plate 362. Each extension spring 366 is attached at one end thereof to the end of the arm 364 opposite the end with the pin 365, on the other side of the pivot pin 343 therefrom, and the other ends of the springs 366 are attached to the attachment block 345. The support arm 364 and pins 365 provide vertical support to the edge of a disc on the disc rest 328.

The support arm 364 is actuated to rotate with respect to the mounting plate 362 by an actuator 368 pivotally mounted on the pivot pin 343 between the support arm 364 and constrained to rotate with the mounting arms 342 about the pivot pin 343. The actuator 368 has a projecting finger 369 (FIGS. 13 and 14) which comes into contact with the upper surface of the support arm 364 when the mounting arms 342 have rotated by a predetermined angular amount. With further rotation of the mounting arms 342, the support arm 364 is rotated downward as shown in FIG. 11, so that the support arm 364 and pins 365 clear the support structure for the webs in the insertion station when the pusher assembly 341 has reached the end of its travel.

In order to separate the second longitudinal edges 256 of the webs 108 and 110 so that a disc may be inserted reliably between the webs, FIG. 8 illustrates in phantom that a side rail 372 underlying the edges 256 of the webs may be provided with vacuum holes connected via passages 374 to a suitable vacuum source, such as a vacuum box 394. The upper surface of the side rail 374 advantageously is angled downwardly toward its edge so that application of vacuum will draw the second web 110 downwardly, thereby separating web 110 from the first web 108 at the second longitudinal edges 256 thereof. However, it has been found that adequate separation of the webs at their edges may alternatively be achieved without the use of such vacuum arrangement, by using a mechanical element (not shown) which intrudes slightly between the webs 108 and 110 at their edges 256 and holds the second web 110 down against the angled side rail 372 at a point just downstream of the disc inserting station 120 and just upstream of the second sealing station 124.

It will be appreciated that downstream of the nip roll indexer 116, the webs 108 and 110 are being pushed by the nip roll indexer. To improve the reliability of web travel in this region of the apparatus 100, the webs 108 and 110 are carried through the insertion station 118 and the second sealing station 124 by the vacuum conveyor 122. The vacuum conveyor 122 extends from just downstream of the nip roll indexer 116 to just downstream of the second sealing station 124. With reference to FIG. 15, the vacuum conveyor 122 includes an endless vacuum belt 380 mounted about a pair of horizontally mounted spaced apart rollers 382 and 384. Idler roller 382 is located just downstream of the nip roll indexer 116, and drive roller 384 is located just downstream of the second sealing station 124. The drive roller 384 is driven by a belt 386 looped about a sprocket 388 mounted on the same shaft (not shown) as the drive roller 384 and a sprocket 390 mounted on the same shaft 278 as the nip roll indexer drive roller 272. Thus, the stepper motor (not shown) which drives the nip roll indexer 116 also drives the drive belt 386 and thereby drives the vacuum belt 380.

The vacuum belt 380 is narrower than the transverse width of the webs 108 and 110 and is located so that the second longitudinal edges 256 of the webs slightly overhang the belt 380. Located beneath the upper flight of the vacuum belt 380 is a vacuum box 394 which in known manner is in sealing contact with the lower surface of the upper flight and is maintained at a pressure below atmospheric pressure by connection with a suitable vacuum source (not shown). The upper flight of the vacuum belt 380 supports the webs 108 and 110 as they are advanced through the disc insertion station 118 and second sealing station 124. The vacuum belt 380 includes holes distributed over the area of the belt overlying the vacuum box 394 so that the lower pressure within the vacuum box draws the webs toward the belt 380.

Flatness of the webs is achieved by driving the vacuum belt 380 at a slightly higher linear speed than the linear speed of the webs through the nip roll indexer 116. Advantageously, the vacuum belt 380 is driven about 1.5 percent faster than the web speed out of the nip roll indexer 116. Thus, slackness in the webs is taken out by the vacuum belt 380. It will be appreciated that too great a vacuum will cause the vacuum belt 380 to stretch the webs, which is undesirable.

Figure 17:
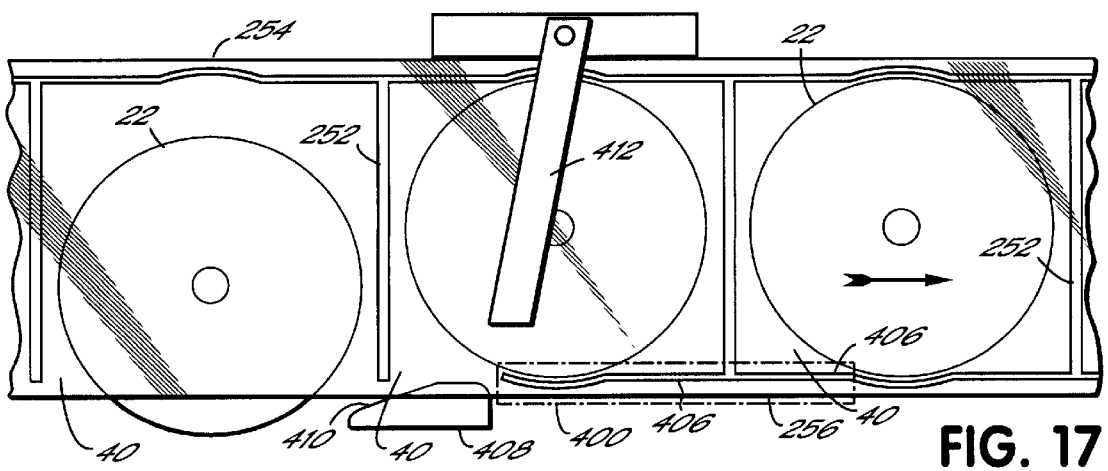
FIG. 17 is an illustrative top plan view of the webs in the region of the disc insertion station and the second sealing station, showing the disc guide and contact arm which act to push the disc away from the second sealing station prior to the sealing operation being performed, where containers as depicted in FIG. 1 are being made.

After exiting the disc insertion station, the webs enter the second sealing station 124, where the webs are joined together adjacent the second longitudinal edges 256 of the webs so as to close each disc-receiving area 40 (FIGS. 16C, 17 18C, and 19). With reference to FIG. 5, the second sealing station 124 includes an ultrasonic welder 396 having a welding head 398 mounted for vertically reciprocating motion with respect to the webs and a cooperating ultrasonic anvil 400 supported on the support table 188 below the second longitudinal edges 256 of the webs which overhang the vacuum belt 380. The welding head 398 has working surfaces 402 which cooperate with working surfaces 404 of the anvil to seal the webs together along a second longitudinal seal line 406 (FIG. 17). The welder 398 is controlled by a welding controller 399 (FIG. 5). A suitable welder 398 is the Series 900 welder (20 kHz) available from Branson. Inc. of Danbury. Conn.

In order to assure that the disc 22 does not interfere with the formation of the second longitudinal seal line 406, a disc guide 408 is located downstream of the insertion station 118 and just upstream of the anvil 400. The disc guide 408 penetrates between the second longitudinal edges 256 of the webs 108 and 110. The disc guide 408 has an edge surface 410 which is at an oblique angle to the second longitudinal edges 256 with the downstream end of the edge surface 410 closer to the disc 22 than the upstream end of the edge surface 410. The edge surface 410 has a height dimension about equal to the thickness of the disc 22. Thus, with respect to a disc 22 that has just been inserted at the insertion station 118 as the webs 108 and 110 are indexed forward with the disc 22 within the disc-receiving area 40, the edge 58 of the disc 22 contacts and rides along the edge surface 410, and accordingly the disc 22 is pushed toward the first longitudinal seal 258 so that the disc 22 is free of the welding head 398 and anvil 400 when the webs are brought to rest for formation of the second longitudinal seal 406. To prevent the disc 22 from riding over the upper surface of the disc guide 408, a cantilevered contact arm 412 is mounted adjacent the first longitudinal edges 254 approximately opposite the disc guide 408 with the free end of the contact arm 412 bearing against the first web 108 to keep the disc 22 flat against the second web 110. After exiting the second sealing station 124, the webs enter the separating station 126 (FIG. 5), which cuts the webs between adjacent disc-receiving areas to create discrete packaging containers each having a disc sealed inside. With reference to FIG. 5, the separating station 126 includes a stationary member 414 having an upper surface which supports the webs and a reciprocating cutting die 416 mounted above the webs for reciprocating motion with respect to the stationary member 414. The reciprocating cutting die 416 intermittently is brought into engagement with the webs to cut the webs along a cut line, and optionally to perform other operations such as hole punching or the like.

The configuration of the cutting die 416 depends on the configuration of the containers being made. For example, when the containers 20 of FIG. 1 are being made, the cutting die 416comprises a simple knife edge which cuts the webs along a cut line at about the center of each transverse seal line 252 (FIG. 16C). When the containers 70 of FIG. 3 are being made, the cutting die comprises both a knife edge which cuts the webs along a cut line at about the center of each transverse seal line 260, and hole-punching dies which punch the holes 81 in the end region 80 of each container 70.

After operation of the separating station 126, the discrete containers are transported away the separating station 126 by the exit conveyor 128. With reference to FIG. 5, the exit conveyor 128 includes an endless belt 420 mounted about a pair of spaced apart rollers 421 and 422. The roller 422 is mounted on the shaft of a continuously running motor (not shown) so that the belt 420 is continuously driven to carry containers from the separating station 126.

Located at the opposite end of the exit conveyor 128 from the separating station 126 is an accumulating conveyor 130 which receives containers from the exit conveyor 128. The accumulating conveyor 130 comprises an endless belt 426 which is formed of interconnected links each of which has an upstanding partition 428 projecting outward. The links are sized such that the space between adjacent partitions 428 will accommodate a number n of containers, such as about 25. The belt 426 is mounted in conventional manner about a pair of sprockets (not shown) which has teeth that engage holes in the belt 426, with one of the sprockets being rotatably driven by a motor (not shown) to drive the belt 426. The motor is controlled by the controller 212 to advance the belt a distance equal to the spacing between partitions 428 once every n successful cycles of the apparatus 100. Advantageously, the belt 426 has at least about 11 partitions 428 that at any given time are substantially vertical, thereby accommodating at least about 250 completed containers in groups of 25. A sensor (not shown) mounted adjacent the downstream end of the conveyor 130 provides a signal when the space between the partitions 428 adjacent the sensor is occupied by containers, so that the apparatus 100 can be temporarily stopped to allow an operator to off-load containers from the accumulating conveyor 130.

The apparatus 100 is controlled by a programmable logic controller (PLC) 212 (FIG. 5). A suitable controller is, for example, a Model 9030 (PLC) available from General Electric Company. The PLC provides overall system cycle control to start the various events and processes that occur within the apparatus (with the exception of the unwinder and the accumulating conveyor, each of which is asynchronously controlled by photoelectric sensors, as previously described). The PLC software builds a virtual 360° rotating position reference (a "virtual camshaft") in which each complete revolution defines a window in which a number of activities or events occur. Those events are repeated with each successive revolution such that with each revolution, a completed container with a disc is output from the system. The system control initiates and synchronizes each activity by assigning to each activity an angular position (or, more accurately, a range of angular positions) within the overall 360° window during which that activity is made to occur. Therefore, each activity has a known and fixed relationship to other activities which relationship is not fixed to an absolute time line. The user has the ability to choose a desired production rate, for example, 3600 packages per hour, and simply by setting the production rate higher or lower, the user can speed up or slow down the entire manufacturing process without having to reset start and stop times for each individual component of the apparatus. For instance, if a production rate of 3600 containers per hour is input to the PLC, the virtual camshaft must rotate through 3600 revolutions in an hour, that is, one revolution per second. Given that information, the PLC increments the virtual camshaft one degree of rotation with each increment of 2.7 milliseconds. Alternatively, if a production rate of 2700 packages per hour is chosen, the PLC would increment the virtual camshaft one degree every 3.7 milliseconds.

For certain events and processes in the apparatus 100, the PLC 212 provides command start signals to other controls.

Figure 20:
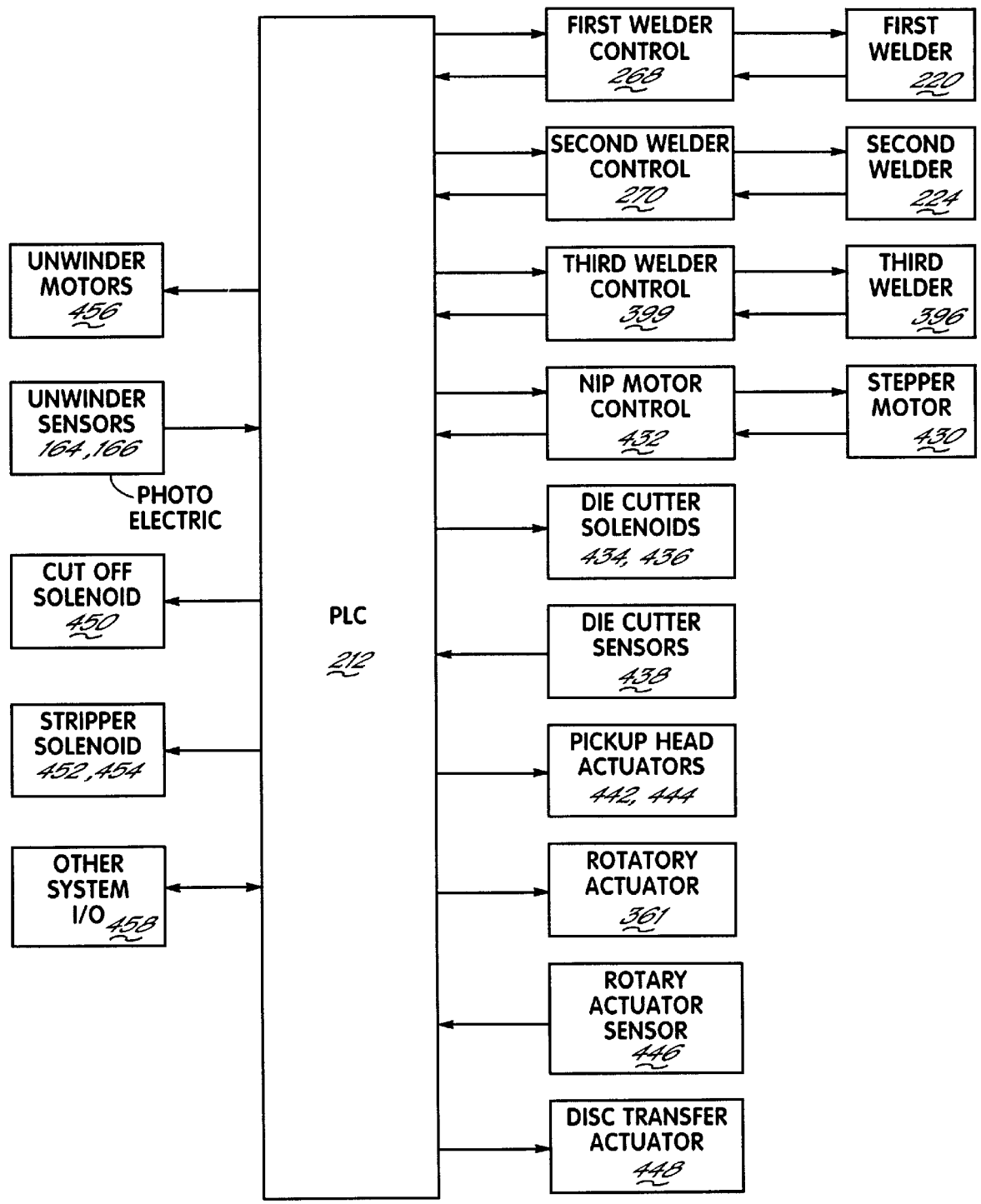
FIG. 20 is a schematic representation of the connections between the controller and the various components of the apparatus.

For example, with reference to FIG. 20, the nip roll indexer 116 is driven by a stepper motor 430 which has its own motor controller 432 in communication with the PLC 212. The motor controller 432 provides the actual motion control for the nip roll indexer 116, and also provides signals to the PLC representing the state of the nip roll indexer 116. Likewise, the welders 220, 226, and 396 each has its own welding controller 268, 270, and 399, respectively, which provides the actual motion control for the reciprocating welding head and the ultrasonic energy control for the formation of the seal lines in the webs, and also provides signals to the PLC 212 representing the state of welder. For these components, the PLC provides intermediate control by simply signaling the respective controller to start its process.

For instance, the user can select the web index distance I corresponding to the length of the container (such as container 20, 70, or 84) by inputting to the PLC the index length, such as 15.7 cm (6.188 inches) for the container 70. Based on the index distance and the selected production rate (parts per hour), the PLC via its programmed instructions is able to provide a command signal to the motor controller 432 at the proper angular orientation so as to provide a stepping motor command that results in the webs being fed by a desired length at a desired velocity, that is, within a time frame required by the production rate. Given the stepping motor command, the stepping motor controller 432 operates the motor 430 in a known way to move the webs the desired length at the desired velocity. During that operation, the motor controller 432 may provide feedback signals to the PLC 212 indicating whether the nip roll is moving, stopped, etc.

For other components, the PLC is directly connected to the actuator and feedback devices and there is no intermediate control device. For example, to control the die cut press 112, the PLC is directly connected to a pair of air solenoids 434, 436 which supply air to the pneumatic cylinder 208 to cause the piston 210 to bring the cutting die 200 down into contact with the first web 108 and to apply pressure to the piston so as to cut the web, and then to cause the piston to raise the cutting die 200 back up. More particularly, at the proper angular orientation of the virtual camshaft, the PLC changes the state of an output signal to a first pneumatic solenoid 434 which functions to release air, that is, pressure, from a first portion of the cylinder 208 which causes the die 200 to drop down and contact the web 108. A first sensor 438, for example, a proximity sensor, changes the state of its output signal in response to detecting that the die has dropped onto the web. The PLC detects the change of state of the input signal from the sensor 438 and accordingly changes the state of an output signal to a second pneumatic solenoid 436 which functions to apply pressurized air to a hydraulic amplifier (not shown) that in turn, applies pressure to a second portion of the pneumatic cylinder which causes the piston 210 to force the die 200 against the web 108. Other sensors may detect the magnitude of the pressure or other conditions and may provide input signal states back to the PLC representing an overpressure condition or other conditions. After a period of time, determined by a timer in the PLC, the PLC changes the state of the output signal to the second solenoid 436 which removes the pressure from the die 200. After a second period of time, the PLC changes the state of the output signal to the first solenoid 434 which causes pressurized air to be applied to the first portion of the cylinder 208, thereby lifting the die up from the web to its original position.

In its normal operation, the PLC alternately updates the I/O 458 and then executes its programmed logic routines. As a part of each logic execution, the PLC updates the angular position of the virtual rotating reference; for example, for 3600 units/hr, if 19 ms have passed since the last update of the virtual rotating reference, the PLC will increment the position of the rotating reference by 7 degrees. The PLC then checks to determine whether the current angular position corresponds to a position at which an activity is to be started or stopped, and if so, the state of the outputs associated with that activity are changed appropriately. The above process is continuously repeated to provide overall system control for the packaging line.

Thus, in use of the apparatus 100, the unwinder 102 is loaded with rolls 104 and 106 of first web 108 and second web 110, respectively, and the free ends of the webs are threaded all the way through the apparatus 100 so that a small length of each web extends beyond the separating station 126. The disc inserting apparatus 120 is loaded with stacks of compact discs. The user then pushes a button on a control interface (not shown) to signal the PLC to begin control of the apparatus 100. The PLC starts its rotating virtual camshaft, and when the angular orientation reaches a value between about zero degrees and four degrees (which represents a "define start" condition), the PLC proceeds to begin control of the various components and processes. The PLC sends a command start signal to the stepper motor controller 432 between about zero degrees and 30 degrees, and the motor controller 432 then indexes the webs, as previously described. At about 15 degrees, the PLC signals a pair of actuators 442, 444 which are connected to the disc transfer assembly pickup heads 322a and 332b, respectively, to lower one of the pickup heads to engage a disc on a spindle 292 and to lower the other pickup head to deposit a disc on the disc rest 328 (as shown in FIG. 8). The pickup heads are then raised back up so that they are fully up by an angular orientation of about 135 degrees.

Meanwhile, the nip roll indexer has brought the webs to rest. At about 90 degrees, the PLC sends a command start signal to the third welder controller 399, and the third welder 396 begins to descend to form the second longitudinal seal lines 406. The third welder must begin applying ultrasonic energy to form a seal by about 180 degrees. Similarly, the first welder controller 268 is started at about 100 degrees and must begin welding by about 180 degrees, and the second welder controller 270 is started at about 125 degrees and must begin welding by about 185 degrees. If any of the welding controllers does not begin its welding operation with its respective window of opportunity, the welding controller raises the welding head back up and generates an error signal to the PLC.

The first solenoid 434 for the die cut press is activated at about 115 degrees to drop the cutting die down onto the first web 108, and the PLC then goes through its control sequence for the die cut press as previously described. The die cutting operation is completed and the cutting die is back up in its starting position by about 320 degrees.

Between about 160 and 185 degrees, the PLC signals the rotary actuator 361 to start rotating in one direction to operate the disc inserter 325 so as to cause the disc which is on the disc rest 328 to be inserted between the webs 108 and 110. The rotary actuator 361 will not rotate through more than 360 degrees, so that on the next cycle of the apparatus, the actuator 361 will be rotated in the opposite direction. A sensor 446 tells the PLC when the rotary actuator 361 has completed a full revolution, which is completed by about 235 degrees of the virtual camshaft revolution.

An actuator 448 for the disc transfer assembly 316, which now has a disc on one of the pickup heads over the spindle 292, is started by the PLC at about 190 degrees to begin rotating the arm 318, and is stopped by about 250 degrees so that the disc is vertically aligned with the disc rest 328 which is back in its home position upon completion of the 360 degree rotation of the rotary actuator 361.

The separating station 126 is actuated by a solenoid 450 controlled by the PLC to begin its operation at about 145 degrees and to finish by about 275 degrees. Finally, solenoids 452 and 454 for the stripper plates for the first and second sealing stations 114 and 124 are actuated by the PLC at about 300 degrees, and the stripping operations are complete by about 345 degrees. The PLC then sees a "define stop" condition when the virtual camshaft reaches about 355 to 359 degrees, signifying that one complete cycle has been completed.

Thus, it will be appreciated that by virtue of the control scheme used in the PLC, the total cycle time for the apparatus remains constant until changed by the user, and any user-defined change in cycle time will not upset the relative timing between the various events and processes which occur within the apparatus. Changing machine speed is therefore easily accomplished by simply changing a number of input constants. Furthermore, degradation in performance of the apparatus is easily identified as failures to execute one or more processes, rather than as a gradual increase in cycle time which is typical for event-based control schemes. Additionally, the control scheme permits error checking to be done in anticipation of the start of the next event, and any given function can be initiated during the execution of a simultaneous function without the control having to see the completion of the previous function. The control is therefore extremely flexible.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. For example, although the apparatus 100 has been illustrated in connection with containers 20, 70, and 84 which are generally rectangular, other container shapes such as containers with rounded edges or even oval or circular containers may be manufactured with relatively slight modifications to the apparatus, without sacrificing the advantages of the invention. Moreover, while ultrasonic welding is presently the preferred technique for forming the seal lines in the webs, other joining techniques may be used, such as adhesive joining, chemical modification, heat sealing, and the like. Additionally, the illustrated order of the various work stations of the apparatus 100 is not critical. Thus, for example, the die cut press 112 could be located downstream of the first sealing station 114 or even between first welder 220 and the second welder 226, with the die cut press 112 performing a cutting operation on the first web 108 without affecting the second web 110. Similarly, although it is advantageous to perform the disc inserting operation after formation of both the first longitudinal seal lines 258 and the transverse seal lines 260, 262, and 264, the inserting apparatus 120 could alternatively be located between the first welder 220 and the second welder 226 or even upstream of both welders 220 and 226, with suitable modifications to insure proper disc locating between the webs. Furthermore, although the webs are conveyed in apparatus 100 by the nip roll indexer 116 together with the vacuum conveyor 122, other ways for conveying the webs may be used. For example, one or more vacuum conveyors may be used without any nip roll indexer, a single nip roll indexer may be located downstream of the second sealing station 124, etc. Additionally, while the apparatus 100 is configured to advance the webs an index distance equal to a container width, and formation of transverse seal lines and insertion of discs occur after each index movement of the webs, the apparatus could alternatively be configured such that the webs are indexed by a distance less than a container width. For instance, the webs could be indexed by one half a container width, such that formation of transverse seal lines and insertion of discs would occur after every second index movement of the webs. The invention in its broader aspects is therefore not limited to the specific details, representative apparatus and method, and illustrative examples shown and described. Accordingly, departures may be made from such details without departing from the spirit or scope of applicant's general inventive concept.

What is claimed is:

1. An apparatus for forming flexible containers, inserting a disc into each container, and sealing each container with a disc inside, comprising:

a web conveyor adapted to intermittently advance free ends of supplies of a plurality of webs including at least a first web and a second web an index distance;

a first sealing station adapted to intermittently engage said webs to join said webs together along a first generally longitudinal seal line adjacent first longitudinal edges of said webs and along a generally transverse seal line, successive operations of the first sealing station creating a plurality of generally transverse seal lines spaced apart along the webs by a distance defining a width dimension of a container, thereby forming in said webs a series of disc-receiving areas between said first and second webs each defined by said first generally longitudinal seal line together with one said generally transverse seal line and a succeeding generally transverse seal line and having an open edge adjacent second longitudinal edges of said webs;

a die-cutting station adapted to intermittently engage said first web to form lines of weakness in said first web each overlying one said disc-receiving area;

a disc inserting apparatus adapted to insert a disc between said first and second webs within one said disc-receiving area;

a second sealing station adapted to engage said webs after insertion of a disc to join said first and second webs together along a second generally longitudinal seal line adjacent second longitudinal edges of said first and second webs, thereby closing said open edge of each said disc-receiving area; and a separating station adapted to cut said webs along a cut line at each said generally transverse seal line such that said webs on both sides of said cut line remain joined together after cutting.

2. The apparatus of claim 1 wherein said first sealing station includes at least one welder for forming said first generally longitudinal seal line and said generally transverse seal line.

3. The apparatus of claim 1 wherein said first sealing station includes a first welder for forming said first generally longitudinal seal line and a second welder for forming said generally transverse seal line, and said second sealing station includes a third welder for forming said second generally longitudinal seal line.

4. The apparatus of claim 3 wherein said second welder is located downstream of said first welder.

5. The apparatus of claim 4 wherein said second welder is located such that each said first generally longitudinal seal line is approximately bisected by one of said generally transverse seal lines.

6. The apparatus of claim 4 wherein said web conveyor includes a nip roll indexer.

7. The apparatus of claim 4 wherein the web conveyor includes a vacuum conveyor.

8. The apparatus of claim 4 wherein the disc inserting apparatus includes a holder for a supply of discs, a disc inserter, and a disc transfer assembly mounted above said holder and said disc transfer assembly, said disc transfer assembly being adapted to remove a disc from said holder and deposit said disc in said disc inserter, said disc inserter being adapted to transport said disc toward said second longitudinal edges and insert said disc between said first and second webs.

9. The apparatus of claim 8 wherein the holder comprises a rotatable turntable supporting a plurality of circumferentially spaced spindles each adapted to support a stack of discs.

10. The apparatus of claim 9, wherein the disc transfer assembly includes a pickup arm rotatably mounted above the turntable and disc inserter, the pickup arm having a first vertically reciprocable pickup head mounted adjacent one end thereof and a second vertically reciprocable pickup head mounted adjacent the other end thereof, each pickup head including at least one vacuum cup for engaging and holding a disc, the pickup arm being positioned so that in one rotational position of the pickup arm one of said pickup heads is vertically aligned with one of said spindles and the other of said pickup heads is vertically aligned with said disc inserter, the pickup arm being rotatable to carry a disc from one of said spindles and place it in vertical alignment with said disc inserter.

11. The apparatus of claim 10 wherein the disc inserter includes a disc rest having a horizontal surface for supporting a disc and a hub for engaging an aperture of said disc to retain said disc on said disc rest, and a transport mechanism connected with said disc rest and operable to translate said disc rest toward said second longitudinal edges of said webs until said disc is partially inserted between said webs and then to move said disc rest away from said disc to disengage said disc rest from said disc, said transport mechanism further having a pusher assembly which engages said disc to fully insert said disc between said webs after disengagement of said disc rest from said disc.

12. The apparatus of claim 11 wherein the transport mechanism includes a cam track formed in a stationary member, a cam follower connected to the disc rest and constrained to remain within the cam track, and an actuation mechanism connected to the cam follower for moving the cam follower along the cam track so as to carry the disc rest toward the webs to insert a disc therebetween.

13. The apparatus of claim 12 wherein the actuation mechanism includes a carriage assembly connected to a horizontal rail oriented generally perpendicular to the direction of web travel, the carriage assembly being slidable along the rail toward and away from the webs, and wherein the cam follower is connected to the disc rest by at least one mounting arm having a first end connected to the disc rest and a second end connected to the carriage assembly, the cam follower being rotatably connected to the at least one mounting arm, the cam track having a first portion extending toward the webs generally perpendicular to the direction of web travel and a second portion extending generally downward, whereby horizontal motion of the carriage assembly toward the webs causes the cam follower to traverse the first portion of the cam track so as to move the disc rest toward the webs to insert a disc therebetween, and then to traverse the second portion of the cam track so as to rotate and move the disc rest downward to disengage the disc.

14. The apparatus of claim 13 wherein the actuation mechanism further includes at least one lever arm having a first end pivotally connected to the carriage assembly and a second end pivotally connected to a stationary pivot mechanism, the at least one lever arm being pivotally connected between the first and second ends thereof to a link which is pivotally connected to the crank of a rotary actuator, whereby rotation of the rotary actuator causes the at least one lever arm to alternately swing through a circular arc toward the webs to move the carriage assembly and the disc rest toward the webs, and then away from the webs to move the carriage assembly and the disc rest away from the webs.

15. The apparatus of claim 1, further comprising a foil stamper adapted to intermittently engage said first web to stamp indicia on said first web.

16. The apparatus of claim 1, further comprising an unwinder including a pair of supports for mounting rolls of said first and second webs.

17. An apparatus for forming flexible containers, inserting a disc into each container, and sealing each container with a disc inside, comprising:
   a web conveyor adapted to intermittently advance free ends of supplies of a plurality of webs including at least a first web and a second web an index distance;
   a first sealing station adapted to intermittently engage said webs to join said webs together along a first generally longitudinal seal line adjacent first longitudinal edges of said webs and along spaced first and second generally transverse seal lines, successive operations of the first sealing station resulting in each first generally transverse seal line being spaced from a succeeding first generally transverse seal line by at least a width dimension of a container, thereby forming in said webs a series of disc-receiving areas between said first and second webs each defined by said first generally longitudinal seal line together with one said second generally transverse seal line and a succeeding said first generally transverse seal line, each disc-receiving area having an open edge adjacent second longitudinal edges of said webs;
   a die-cutting station adapted to intermittently engage said first web to form lines of weakness in said first web each overlying one said disc-receiving area, said lines of weakness being breakable to create disc-removing openings in said first web;
   a disc inserting apparatus adapted to insert a disc between said first and second webs within one said disc-receiving area;
   a second sealing station adapted to engage said webs after insertion of a disc to join said first and second webs together along a second generally longitudinal seal line adjacent said second longitudinal edges of said first and second webs, thereby closing said open edge of each said disc-receiving area; and
   a separating station adapted to cut said webs along a cut line between said first and second transverse seal lines.

18. The apparatus of claim 17 wherein said first sealing station includes at least one welder for forming said first generally longitudinal seal line and said first and second generally transverse seal lines.

19. The apparatus of claim 17 wherein said first sealing station includes a first welder for forming said first generally longitudinal seal line and a second welder for forming said first and second generally transverse seal lines.

20. The apparatus of claim 19 wherein said second welder is located downstream of said first welder.

21. The apparatus of claim 20 wherein said second welder is located such that each said first generally longitudinal seal line is approximately bisected by one of said first and second generally transverse seal lines.

22. The apparatus of claim 21 wherein the web conveyor includes a nip roll indexer.

23. The apparatus of claim 21 wherein the web conveyor includes a vacuum conveyor.

24. The apparatus of claim 21 wherein the disc inserting apparatus includes a holder for a supply of discs, a disc inserter, and a disc transfer assembly mounted above said holder and said disc transfer assembly, said disc transfer assembly being adapted to remove a disc from said holder and deposit said disc in said disc inserter, said disc inserter being adapted to transport said disc toward said second longitudinal edges and insert said disc between said first and second webs.

25. The apparatus of claim 24 wherein the disc inserter includes a disc rest having a horizontal surface for supporting a disc and a hub for engaging an aperture of said disc to retain said disc on said disc rest, and a transport mechanism connected with said disc rest and operable to translate said disc rest toward said second longitudinal edges of said webs until said disc is partially inserted between said webs and then to move said disc rest away from said disc to disengage said disc rest from said disc, said transport mechanism further having a pusher assembly which engages said disc to fully insert said disc between said webs after disengagement of said disc rest from said disc.

26. The apparatus of claim 17, further comprising a foil stamper adapted to intermittently engage said first web to stamp indicia on said first web.

27. The apparatus of claim 17, further comprising an unwinder including a plurality of supports for mounting rolls of said plurality of webs.

28. The apparatus of claim 17 wherein said first sealing station includes a first ultrasonic welder for forming said first generally longitudinal seal line and a second ultrasonic welder for forming said first and second generally transverse seal lines, and said second sealing station includes a third ultrasonic welder for forming said second generally longitudinal seal line, said second ultrasonic welder being located downstream of said first ultrasonic welder such that each said first longitudinal seal line is approximately bisected by one of said first and second transverse seal lines;
   wherein the web conveyor includes a nip roll indexer and a vacuum conveyor which is oversped relative to said nip roll indexer; and
   wherein the disc inserting apparatus includes a rotatable turntable supporting a plurality of circumferentially spaced spindles each adapted to support a stack of discs, a disc inserter, and a disc transfer assembly mounted above said turntable and said disc inserter and adapted to remove a topmost disc from one said stack and deposit said disc in said disc inserter.

29. The apparatus of claim 28, wherein the disc transfer assembly includes a pickup arm rotatably mounted above the turntable and disc inserter, the pickup arm having a first vertically reciprocable pickup head mounted adjacent one end thereof and a second vertically reciprocable pickup head mounted adjacent the other end thereof, each pickup head including at least one vacuum cup for engaging and holding a disc, the pickup arm being positioned so that in one rotational position of the pickup arm one of said pickup heads is vertically aligned with one of said spindles and the other of said pickup heads is vertically aligned with said disc inserter, the pickup arm being rotatable to carry a disc from one of said spindles and place it in vertical alignment with said disc inserter.

30. The apparatus of claim 29 wherein the disc inserter includes a disc rest adapter to support a disc and a transport mechanism connected with said disc rest and operable to move said disc rest together with a disc thereon so as to insert said disc between said second longitudinal edges of said webs, the transport mechanism including a cam track formed in a stationary member, a cam follower connected to the disc rest and constrained to remain within the cam track, and an actuation mechanism connected to the cam follower for moving the cam follower along the cam track so as to carry the disc rest toward the webs to insert a disc therebetween.

31. The apparatus of claim 30 wherein the actuation mechanism includes a carriage assembly connected to a horizontal rail oriented generally perpendicular to the direction of web travel, the carriage assembly being slidable along the rail toward and away from the webs, and wherein the cam follower is connected to the disc rest by at least one mounting arm having a first end rigidly connected to the disc rest and a second end pivotally connected to the carriage assembly, the cam follower being rotatably connected to the at least one mounting arm, the cam track having a first portion extending toward the webs generally perpendicular to the direction of web travel and a second portion extending generally downward, whereby horizontal motion of the carriage assembly toward the webs causes the cam follower to traverse the first portion of the cam track so as to move the disc rest toward the webs to insert a disc therebetween, and then to traverse the second portion of the cam track so as to rotate and move the disc rest downward to disengage the disc.

32. The apparatus of claim 31 wherein the actuation mechanism further includes at least one lever arm having a first end connected to the carriage assembly and a second end connected to a stationary pivot mechanism, the at least one lever arm being connected between the first and second ends thereof to a link which is connected to the crank of a rotary actuator, whereby rotation of the rotary actuator causes the at least one lever arm to alternately swing through a circular arc toward the webs to move the carriage assembly and the disc rest toward the webs, and then away from the webs to move the carriage assembly and the disc rest away from the webs.

33. An apparatus for forming flexible containers, inserting a disc into each container, and sealing each container with a disc inside, comprising:

a web conveyor adapted to intermittently advance free ends of supplies of a plurality of webs including at least a first web and a second web an index distance;

a first sealing station adapted to intermittently engage said webs to join said webs together along generally transverse seal lines and first generally longitudinal seal lines adjacent first longitudinal edges of said webs so as to form in said webs a series of disc-receiving areas between said first and second webs each having an open edge adjacent second longitudinal edges of said webs;

a die-cutting station adapted to intermittently engage said first web to form a line of weakness in said first web overlying one said disc-receiving area;

a disc inserting apparatus adapted to insert a disc between said first and second webs within one said disc-receiving area, the disc inserting apparatus including a disc rest having a horizontal surface for supporting a disc and a hub for engaging an aperture of said disc to retain said disc on said disc rest, and a transport mechanism connected with said disc rest and operable to translate said disc rest toward said second longitudinal edges of said webs until said disc is partially inserted between said webs and then to move said disc rest away from said disc to disengage said disc rest from said disc, said transport mechanism further having a pusher assembly which engages said disc to fully insert said disc between said webs after disengagement of said disc rest from said disc;

a second sealing station adapted to engage said webs after insertion of a disc to join said first and second webs together along second generally longitudinal seal lines adjacent said second longitudinal edges of said first and second webs, thereby closing said open edge of each said disc-receiving area; and a separating station adapted to cut said webs along a generally transverse cut line to create discrete containers each having a disc sealed therein.

34. The apparatus of claim 33 wherein the transport mechanism includes a cam track formed in a stationary member, a cam follower connected to the disc rest and constrained to remain within the cam track, and an actuation mechanism connected to the cam follower for moving the cam follower along the cam track so as to carry the disc rest toward the webs to insert a disc therebetween, the actuation mechanism including a carriage assembly connected to a horizontal rail oriented generally perpendicular to the direction of web travel, the carriage assembly being slidable along the rail toward and away from the webs, and wherein the cam follower is connected to the disc rest by at least one mounting arm having a first end connected to the disc rest and a second end connected to the carriage assembly, the cam follower being connected to the at least one mounting arm, the cam track having a first portion extending toward the webs generally perpendicular to the direction of web travel and a second portion extending generally downward, whereby horizontal motion of the carriage assembly toward the webs causes the cam follower to traverse the first portion of the cam track so as to move the disc rest toward the webs to insert a disc therebetween, and then to traverse the second portion of the cam track so as to rotate and move the disc rest downward to disengage the disc.

35. The apparatus of claim 34 wherein the actuation mechanism further includes at least one lever arm having a first end connected to the carriage assembly and a second end connected to a stationary pivot mechanism, the at least one lever arm being connected between the first and second ends thereof to a link which is connected to the crank of a rotary actuator, whereby rotation of the rotary actuator causes the at least one lever arm to alternately swing through a circular arc toward the webs to move the carriage assembly and the disc rest toward the webs, and then away from the webs to move the carriage assembly and the disc rest away from the webs.

36. The apparatus of claim 35, wherein the pusher assembly includes a mounting plate secured to the carriage assembly and having a generally vertical surface positioned to engage an edge of the disc on the disc rest so as to push the disc horizontally between the webs, and at least one support arm secured to the carriage assembly and having an inclined surface positioned to provide vertical support to an edge of the disc as the disc is pushed between the webs.

37. The apparatus of claim 35, further comprising an accumulating conveyor adjacent a discharge end of the apparatus for receiving discrete containers from the separating station, the accumulating conveyor including an endless conveyor belt having a plurality of upstanding partitions projecting therefrom and regularly spaced along the belt, the accumulating conveyor being operable to receive the discrete containers between adjacent said partitions and to advance the belt by the spacing between adjacent partitions after a predetermined number of containers has been received.

38. The apparatus of claim 37, further comprising an exit conveyor between the separating station and the accumulating conveyor for transporting discrete containers to the accumulating conveyor.

39. The apparatus of claim 33, wherein the die-cutting station forms lines of weakness in said first web defining flaps which are partially separable from the remainder of said first web upon breaking of said lines of weakness.

40. A method of making flexible packaging containers with a disc sealed inside each container, comprising:

intermittently advancing free ends of a first web and a second web an index distance defining at least a width dimension of a container;

intermittently joining together said first and second webs along a first generally longitudinal seal line adjacent and parallel to first longitudinal edges of said webs and along at least one generally transverse seal line perpendicular to said first longitudinal edges so as to form in said webs a series of disc-receiving areas each defined by said first longitudinal seal line together with one of said transverse seal lines and a succeeding one of said transverse seal lines, each disc-receiving area having an open edge adjacent second longitudinal edges of said webs;

intermittently forming lines of weakness in said intermittently advancing first web each overlying one of said disc-receiving areas;

successively inserting a disc into each of said disc-receiving areas of said intermittently advancing webs;

after said inserting step, intermittently joining together said first and second webs along a second longitudinal seal line adjacent and parallel to said second longitudinal edges of said webs so as to close said open edge of each said disc-receiving area; and intermittently cutting said webs along a cut line adjacent and parallel to one of said transverse seal lines so as to create discrete packaging containers each having a disc sealed inside.

41. A disc inserting apparatus for inserting a disc between edges of first and second webs in a packaging apparatus, comprising:

a disc rest having a surface for supporting a disc and a hub for engaging an aperture of said disc to retain said disc on said disc rest; and a transport mechanism connected with said disc rest and operable to translate said disc rest toward said edges of said webs until said disc is partially inserted between said webs and then to move said disc rest away from said disc to disengage said disc rest from said disc, the transport mechanism including a cam track formed in a stationary member, a cam follower connected to the disc rest and constrained to remain within the cam track, and an actuation mechanism connected to the cam follower for moving the cam follower along the cam track so as to carry the disc rest toward the webs to insert a disc therebetween;

the actuation mechanism including a carriage assembly connected to a rail oriented generally perpendicular to the direction of web travel and in a plane generally parallel to an upper surface of the first web, the carriage assembly being slidable along the rail toward and away from the webs, the cam follower being connected to the disc rest by at least one mounting arm having a first end connected to the disc rest and a second end connected to the carriage assembly, the cam follower being connected to the at least one mounting arm, the cam track having a first portion extending toward the webs generally perpendicular to the direction of web travel and generally in a plane parallel to the upper surface of the first web and a second portion extending in a direction generally normal to the upper surface of the first web, whereby motion of the carriage assembly toward the webs causes the cam follower to traverse the first portion of the cam track so as to move the disc rest toward the webs to insert a disc therebetween, and then to traverse the second portion of the cam track so as to move the disc rest away from the disc to disengage the disc.

42. The disc inserter of claim 41 wherein the actuation mechanism further includes at least one lever arm having a first end connected to the carriage assembly and a second end connected to a stationary pivot mechanism, the at least one lever arm being connected between the first and second ends thereof to a link which is connected to the crank of a rotary actuator, whereby rotation of the rotary actuator causes the at least one lever arm to alternately swing through a circular arc toward the webs to move the carriage assembly and the disc rest toward the webs, and then away from the webs to move the carriage assembly and the disc rest away from the webs.

43. The disc inserter of claim 42, wherein the transport mechanism further includes a pusher assembly including a mounting plate secured to the carriage assembly and having a generally vertical surface positioned to engage an edge of the disc on the disc rest so as to push the disc between the webs in a direction generally parallel to the upper surface of the first web, and at least one support arm secured to the carriage assembly and having an inclined surface positioned to provide support to an edge of the disc in a direction generally normal to the first web upper surface.

44. The disc inserter of claim 42 wherein the first end of the at least one mounting arm is rigidly connected to the disc rest and the second end of the at least one mounting arm is rigidly connected to the carriage assembly, whereby motion of the carriage assembly toward the webs causes the disc rest to undergo a generally translational movement as the cam follower traverses the first portion of the cam track, and then to undergo a combined rotational and translational movement as the cam follower traverses the second portion of the cam track so as to disengage the disc rest from the disc.

* * * * *

UNITED STATES PATENT AND TRADEMARK OFFICE
CERTIFICATE OF CORRECTION

PATENT NO.    : 5,875,614

DATED         : March 2, 1999

INVENTOR(S)   : Ross O. Youngs et al.

It is certified that error appears in the above-identified patent and that said Letters Patent is hereby corrected as shown below:

Column 8, line 9, please delete "height 11" and replace with --height H--.

Column 8, line 35, please delete "closings" and replace with --closing--.

Column 9, line 5, please delete "extend" and replace with --extending--.

Column 11, line 59, please delete "nip roller" and replace with --nip roller 156--.

Column 12, line 34, please delete "108 and 10" and replace with --108 and 110--.

Column 16, line 19, please delete "that were" and replace with --that where--.

Column 16, line 28, please delete "is short" and replace with --as short--.

Column 16, line 35, please delete "joined alone" and replace with --joined along--.

Column 22, line 45, a paragraph break should be inserted before the sentence starting "After exiting...".

UNITED STATES PATENT AND TRADEMARK OFFICE
CERTIFICATE OF CORRECTION

PATENT NO. : 5,875,614
DATED : March 2, 1999
INVENTOR(S) : Ross O. Youngs et al.

It is certified that error appears in the above-indentified patent and that said Letters Patent is hereby corrected as shown below:

Column 23, line 17, please delete "which has teeth" and replace with -- which have teeth --.

Signed and Sealed this

Nineteenth Day of October, 1999

Attest:

Attesting Officer

Q. TODD DICKINSON

Acting Commissioner of Patents and Trademarks